(12) United States Patent
Xu et al.

(10) Patent No.: US 12,136,735 B2
(45) Date of Patent: Nov. 5, 2024

(54) ELECTROACTIVE MATERIALS MODIFIED WITH MOLECULAR THIN FILM SHELL

(71) Applicants: HONDA MOTOR CO., LTD., Tokyo (JP); California Institute of Technology, Pasadena, CA (US)

(72) Inventors: Qingmin Xu, Dublin, OH (US); Christopher Brooks, Dublin, OH (US); Ryan McKenney, Roseville, MN (US); Thomas Miller, III, South Pasadena, CA (US); Simon C. Jones, Whittier, CA (US); Steve Munoz, Pasadena, CA (US); Victoria Davis, Santa Clarita, CA (US)

(73) Assignees: HONDA MOTOR CO., LTD., Tokyo (JP); California Institute of Technology, Pasadena, CA (US)

( * ) Notice: Subject to any disclaimer, the term of this patent is extended or adjusted under 35 U.S.C. 154(b) by 65 days.

(21) Appl. No.: 16/444,854

(22) Filed: Jun. 18, 2019

(65) Prior Publication Data
US 2020/0185722 A1 Jun. 11, 2020

Related U.S. Application Data

(60) Provisional application No. 62/775,748, filed on Dec. 5, 2018.

(51) Int. Cl.
*H01M 4/36* (2006.01)
*C08G 63/685* (2006.01)
*C08K 3/16* (2006.01)
*C08L 67/02* (2006.01)
*H01M 4/583* (2010.01)
(Continued)

(52) U.S. Cl.
CPC ........ *H01M 4/5835* (2013.01); *C08G 63/685* (2013.01); *C08K 3/16* (2013.01); *C08L 67/02* (2013.01); *H01M 4/366* (2013.01); *H01M 4/667* (2013.01); *H01M 10/36* (2013.01);
(Continued)

(58) Field of Classification Search
None
See application file for complete search history.

(56) References Cited

U.S. PATENT DOCUMENTS 4,052,539 A 10/1977 Shropshire et al.
4,931,172 A 6/1990 Kobos et al.
(Continued)

FOREIGN PATENT DOCUMENTS

CA 2781043 A1 5/2011
CN 101156260 A 4/2008
(Continued)

OTHER PUBLICATIONS

JP2008021415A—machine translation.*
(Continued)

*Primary Examiner* — Haixia Zhang
(74) *Attorney, Agent, or Firm* — ArentFox Schiff LLP; Mark Duell

(57) ABSTRACT

An electrochemically active structure having a core and a shell at least partially surrounding the core. Also a method of making the electrochemically active structure as described herein as well as electrochemical cells comprising the electrochemically active structure as described herein.

8 Claims, 26 Drawing Sheets
(7 of 26 Drawing Sheet(s) Filed in Color)

(51) Int. Cl.
*H01M 4/66* (2006.01)
*H01M 10/36* (2010.01)
*B82Y 40/00* (2011.01)

(52) U.S. Cl.
CPC ......... *B82Y 40/00* (2013.01); *C08K 2201/005* (2013.01); *C08L 2207/53* (2013.01)

(56) References Cited

U.S. PATENT DOCUMENTS

| | | | |
|---|---|---|---|
| 7,007,972 B1 * | 3/2006 | Radhakrishnan | B60R 21/26 280/736 |
| 7,722,993 B2 | 5/2010 | Potanin | |
| 9,166,249 B2 | 10/2015 | Darolles et al. | |
| 9,705,124 B2 | 7/2017 | Walker et al. | |
| 2003/0008145 A1 | 1/2003 | Goldstein | |
| 2006/0070491 A1 | 4/2006 | Yang et al. | |
| 2007/0209475 A1 * | 9/2007 | Sakaue | H01B 1/22 75/255 |
| 2009/0029237 A1 | 1/2009 | Yazami | |
| 2009/0269269 A1 * | 10/2009 | White | B82Y 30/00 977/777 |
| 2010/0178227 A1 | 7/2010 | Kim et al. | |
| 2010/0285358 A1 | 11/2010 | Cui et al. | |
| 2011/0143219 A1 | 6/2011 | Weiss et al. | |
| 2011/0274832 A1 | 11/2011 | Dai et al. | |
| 2012/0003392 A1 * | 1/2012 | Godfrey | B22F 1/054 118/723 R |
| 2012/0202112 A1 | 8/2012 | Yushin et al. | |
| 2012/0270231 A1 | 10/2012 | Smith et al. | |
| 2013/0078510 A1 | 3/2013 | Reynolds et al. | |
| 2013/0092885 A1 | 4/2013 | Cho et al. | |
| 2013/0115484 A1 | 5/2013 | Li et al. | |
| 2013/0122361 A1 | 5/2013 | Yazami | |
| 2013/0130109 A1 | 5/2013 | Archer et al. | |
| 2013/0133934 A1 | 5/2013 | Flores et al. | |
| 2013/0171060 A1 | 7/2013 | Vo-Dinh et al. | |
| 2013/0189574 A1 | 7/2013 | Crepel et al. | |
| 2013/0196844 A1 | 8/2013 | Keller et al. | |
| 2013/0248775 A1 * | 9/2013 | Kurihara | B22F 1/102 75/343 |
| 2013/0288892 A1 | 10/2013 | Lauterbach et al. | |
| 2013/0323595 A1 | 12/2013 | Sohn et al. | |
| 2014/0377457 A1 | 12/2014 | Liu et al. | |
| 2015/0053464 A1 | 2/2015 | Jeong et al. | |
| 2015/0099182 A1 * | 4/2015 | Singh | H01M 4/134 429/231.6 |
| 2015/0118496 A1 | 4/2015 | Cho et al. | |
| 2015/0155546 A1 | 6/2015 | Yushin et al. | |
| 2015/0194661 A1 | 7/2015 | Ju et al. | |
| 2015/0311508 A1 | 10/2015 | Cairns | |
| 2015/0328629 A1 | 11/2015 | Cho et al. | |
| 2016/0017180 A1 | 1/2016 | Schmidt et al. | |
| 2016/0029482 A1 | 1/2016 | Young et al. | |
| 2016/0043384 A1 | 2/2016 | Zhamu et al. | |
| 2016/0087308 A1 * | 3/2016 | Nakamoto | H01M 10/0569 429/341 |
| 2016/0351896 A1 | 12/2016 | Yushin et al. | |
| 2017/0062874 A1 | 3/2017 | Jones et al. | |
| 2017/0352921 A1 | 12/2017 | Nakamoto et al. | |
| 2018/0175382 A1 | 6/2018 | Chou et al. | |
| 2018/0214945 A1 | 8/2018 | Chou et al. | |
| 2018/0301764 A1 | 10/2018 | Chou et al. | |

FOREIGN PATENT DOCUMENTS

| | | |
|---|---|---|
| CN | 101341614 A | 1/2009 |
| CN | 101501790 A | 8/2009 |
| CN | 102106025 A | 6/2011 |
| CN | 102612776 A | 7/2012 |
| CN | 102714099 A | 10/2012 |
| CN | 102812586 A | 12/2012 |
| CN | 103087805 A | 5/2013 |
| CN | 103620842 A | 3/2014 |
| CN | 103779533 A1 | 5/2014 |
| CN | 104332609 A | 2/2015 |
| CN | 104936728 A | 9/2015 |
| CN | 105006596 A | 10/2015 |
| CN | 105024092 A | 11/2015 |
| CN | 105449280 A | 3/2016 |
| CN | 106063004 A | 10/2016 |
| CN | 107452953 A | 12/2017 |
| DE | 10 2014 211 907 A1 | 12/2014 |
| JP | H02098659 A | 4/1990 |
| JP | 2007-294196 A | 11/2007 |
| JP | 2008021415 A | 1/2008 |
| JP | 2008-536285 A | 9/2008 |
| JP | 2010003675 A | 1/2010 |
| JP | 2010-80221 A | 4/2010 |
| JP | 2010-519682 A | 6/2010 |
| JP | 2015-8136 A | 1/2015 |
| JP | 2015518264 A | 6/2015 |
| JP | 2016-505704 A | 2/2016 |
| JP | 2016-076499 A | 5/2016 |
| JP | 2016526264 A | 9/2016 |
| JP | 2017091701 A | 5/2017 |
| JP | 2017514988 A | 6/2017 |
| JP | 2017216208 A | 12/2017 |
| JP | 2018-63905 A | 4/2018 |
| JP | 2020047526 A | 3/2020 |
| KR | 10-2015-0064948 A | 6/2015 |
| KR | 20160047022 A | 5/2016 |
| WO | WO 2007/146453 A2 | 12/2007 |
| WO | WO 2008/048716 A2 | 4/2008 |
| WO | WO 2009/157033 A2 | 12/2009 |
| WO | WO 2010/107720 A2 | 9/2010 |
| WO | WO 2011/063541 A2 | 6/2011 |
| WO | WO 2012/118446 A1 | 9/2012 |
| WO | WO 2016/047906 A1 | 3/2016 |
| WO | WO 2016/068594 A1 | 5/2016 |
| WO | WO 2017/025957 A1 | 2/2017 |
| WO | WO 2019/226663 A1 | 11/2019 |
| WO | WO 2019/228663 A1 | 11/2019 |
| WO | WO 2019/246265 A1 | 12/2019 |

OTHER PUBLICATIONS

Francois Tanguy et al., "Lowering Interfacial Chemical Reactivity of Oxide Materials for Lithium Batteries. A Molecular Grafting Approach", Journal of Materials Chemistry, vol. 19, No. 27, 2009, pp. 4771-4777. The Royal Society of Chemistry (RSC), https://doi.org/10.1039/b901387c. (Year: 2009).

Bhatia H. et al., "Conductivity Optimization of Tysonite-type La1-xBaxF3-x Solid Electrolytes for Advanced Fluoride Ion Battery", ACS Applied Materials & Interfaces, Jun. 2017, [retrieved on Jan. 30, 2020], vol. 9, Issue 28, 11 Pages Total.

International Search Report and Written Opinion, issued by International Searching Authority in counterpart International Patent Application No. PCT/US2019/064792, mailed on Mar. 2, 2020.

Kim H. K. et al., "Reduction of the Work Function of Gold by N-Heterocyclic Carbenes", Chemistry of Materials (online), Apr. 12, 2017 (Apr. 12, 2017) [retrieved on Jan. 30, 2020], vol. 29, issue 6, pp. 3403-3411.

Zeb G. et al., "Surface Treatments for Controlling Solid Electrolyte Interphase Formation on Sn/Graphene Composite Anodes for High-Performance Li-Ion Batteries", Journal of Physical Chemistry C, Jul. 10, 2017 (Jul. 10, 2017) [retrieved on Jan. 30, 2020], vol. 121, issue 31, pp. 16682-16692.

International Search Report and Written Opinion, issued by International Searching Authority in counterpart International Patent Application No. PCT/US2019/033334, mailed on Aug. 2, 2019, (PCT/ISA/210, PCT/ISA/220 & PCT/ISA/237).

Benjamin C-K. Tee et al., "An electrically and mechanically self-healing composite with pressure- and flexion-sensitive properties for electronic skin applications", Nature Nanotechnology, vol. 7, 2012 Macmillan Publishers Limited, (8 Pages Total), Dec. 2012.

Christene A. Smith et al., "N-Heterocyclic Carbenes in Materials Chemistry", Chem. Rev. 119, 2019 American Chemical Society, pp. 4986-5056, (2019).

(56) References Cited

OTHER PUBLICATIONS

Fan Cui et al., "Synthesis of Ultrathin Copper Nanowires Using Tris(trimethylsilyl)silane for High-Performance and Low-Haze Transparent Conductors", American Chemical Society, NANO Letters, DOI:10.1021/acs.nanolett.5b03422, (2015), (6 Pages total).
Michael A. Webb et al., "Systematic Computational and Experimental Investigation of Lithium-Ion Transport Mechanisms in Polyester-Based Polymer Electrolytes", 2015 American Chemical Society, ACS Cent. Sci. 2015, 1, pp. 198-205, (2015).
Michael A. Webb et al., Supporting Information, Chemically Specific Dynamic Bond Percolation Model for Ion Transport in Polymer Electrolytes, Macromolecules, 48, 7346 (2015), (12 Pages total).
Oxtoby et al., Principles of Modern Chemistry, Electrochemistry, Unit 3: Equilibrium in Chemical Reactions, Fourth Edition, pp. 401-443, (1999).
Philippe Cordier et al., "Self-healing and thermoreversible rubber supramolecular assembly", Nature Letters, vol. 451, 2008 Nature Publishing Group, (4 Pages Total), Feb. 21, 2008.
Thomas F. Miller, III, et al., "Designing Polymer Electrolytes for Safe and High Capacity Rechargeable Lithium Batteries", 2017 American Chemical Society, Acc. Chem. Res. 2017, 50, pp. 590-593, (2017).
International Search Report and Written Opinion, issued by International Searching Authority in corresponding International Application No. PCT/US2019/037994, mailed on Sep. 3, 2019, (PCT/ISA/210, PCT/ISA/220 & PCT/ISA/237).
F. Gschwind et al., Review: Fluoride ion batteries: Theoretical performance, safety, toxicity, and a combinatorial screening of new electrodes, Journal of Fluorine Chemistry, vol. 182, pp. 76-90, (2016).
Communication dated Dec. 7, 2021, from the Japanese Patent Office in related application No. 2019-532014.
Katia Guerin et al., "Core-Shell Ni—NiF2 as Cathode Materials for Secondary Lithium Batteries", IMLB 2016 (18th International Meeting on Lithium Batteries), (2016) (2 Pages Total), https://ecs.confex.com/ecs/imlb2016/webprogram/Paper76293.html.
M. Anji Reddy et al., "Batteries based on fluoride shuttle", Journal of Materials Chemistry, vol. 21, No. 43, pp. 17059-17062, Nov. 21, 2011.
Communication dated Jun. 9, 2020, from the European Patent Office in related European Application No. 17880278.1.
Luiz G. Jacobsohn et al., "Preparation and Characterization of Rare Earth Doped Fluoride Nanoparticles", Materials, vol. 3, No. 3, (2010), ISSN: 1996-1944, pp. 2053-2068.
Michelle Lukosi et al., "Recent advances in gold-metal oxide core-shell nanoparticles: Synthesis, characterization, and their application for heterogeneous catalysis", Frontiers of Chemical Science and Engineering, Higher Education Press, Heidelberg, vol. 10, No. 1, (2016), pp. 39-56.
"Lutensol(R) AO types" [online], Mar. 2014 (Mar. 2014) [retrieved on Jan. 29, 2020], retrieved from the Internet: <https://biakhim.com.ua/index.php?option=com_k2&Itemid=1174&id=901_f6cc99717606f04a2abc418ab94cc6b1&lang=ru&task=download&view=item> 7 p.; see entire document, especially, p. 2.
International Search Report and Written Opinion, issued by International Searching Authority in counterpart International Patent Application No. PCT/US19/64736, mailed on Feb. 25, 2020.
B.P. Sobolev et al., "Mechanochemical Synthesis of Nonstoichiometric Fluorite Ca1-xLaxF2+x Nanocrystals from CaF2 and LaF3 Single Crystals" Crystallography Reports, vol. 50, No. 3, pp. 478-485, 2005.
Charles J. McDonald et al., "Hollow latex particles: synthesis and applications" Advanced in Colloid and Interface Science, vol. 99, pp. 181-213, 2002.
David Lou et al., "Hollow Micro-/Nanostructures: Synthesis and Applications", Advanced Materials, vol. 20, pp. 3987-4019, 2008.
Hiroyuki Ohno, "Electrochemical Aspects of Ionic Liquids" Wiley-Interscience, New York, 2005.
Hoe Jin Hah et al. "New synthetic route for preparing rattle-type silica particles with metal cores" Chem. Commun., pp. 1012-1013, 2004.
J. McBreen et al., "New approaches to the design of polymer and liquid electrolytes for lithium batteries", Journal of Power Sources, vol. 89, pp. 163-167, 2000.
Lukasz Gorski et al. "Complexes of tetra-tert-butyl-tetraazaporphine with Al(III) and Zr(IV) cations as fluoride selective ionophores" Analytica Chimica Acta 633, pp. 181-187, 2009.
Lukasz Gorski et al., "Fluoride-selective polymeric membrane electrodes based on Zr(IV)- and Al(III)-salen ionophores of various structures", Analytica Chimica Acta 655, pp. 39-46, 2010.
N. I. Sorokin et al., "Nonstoichiometric Fluorides-Solid Electrolytes for Electrochemical Devices: A Review" Crystallography Reports, vol. 52., No. 5., pp. 842-863, 2007.
Nanditha G. Nair et al., "Fluorinated Boroxin-Based Anion Receptors for Lithium Ion Batteries: Fluoride Anion Binding, Ab Initio Calculations, and Ionic Conductivity Studies", The Journal of Physical Chemistry A, vol. 113, pp. 5918-5926, May 2009.
P.J. Gellings et al., "The CRC Handbook of Solid State Electrochemistry", pp. 195-222, 1997.
Perrin Walker et al., "Handbook of Metal Etchants", CRC 1991.
PubChem. Citrate May 27, 2016. Retrieved from Internet: <URL: http://pubchem.ncbi.nlm.nih.gov/compound/citrate>. as viewed on Feb. 6, 2018.
Shinobu Fujihara et al., "Sol-Gel Processing of LaF3 Thin Films" Journal of the Ceramic Society of Japan vol. 106, pp. 124-126, 1998.
Shlomo Magdassi et al., "Copper Nanoparticles for Printed Electronics: Routes Towards Achieving Oxidation Stability" Materials, vol. 3, pp. 4626-4638, 2010.
Stephan Rudiger et al., "The fluorolytic sol-gel route to metal fluorides—a versatile process opening a variety of application fields", Dalton Transactions, No. 9, pp. 1117-1127, 2008.
V. Trnovcova et al., "Fluoride Solid Electrolytes", Russian Journal of Electrochemistry, vol. 45, No. 6, pp. 630-639, 2009.
William C. West et al., "Reversible Intercalation of Fluoride-Anion Receptor Complexes in Graphite", Journal of the Electrochemical Society, vol. 154, pp. A929-A936, 2007.
Written Opinion and International Search Report of related application No. PCT/US2017/066800 dated Mar. 5, 2018.
Communication dated Mar. 28, 2022, from the State Intellectual Property Office of People's Republic of China in Application No. 201780073648.3.
Li, Ting, et al., "Electrochemical Conversion Reactions and Their Applications for Rechargeable Batteries", Journal of Electrochemistry, vol. 21, No., 2, pp. 115-122, 2015, <http://electrochem.xmu.edu.cn>, (Abstract on p. 122).
Office Action dated Nov. 29, 2022, issued by the Korean Patent Office in related Korean Application No. 10-2019-7019489.
Office Action dated Apr. 4, 2023, issued by the Japanese Patent Office in related Japanese Application No. 2020-565794.
Office Action in CN201980035313.1, mailed Oct. 10, 2023, 11 pages.
Office Action and Search Report dated Jan. 2, 2024 issued by the Chinese Patent Office in related Chinese Application No. 201980080733.1.
Barrelet, et al., "Surface Characterization and Electrochemical Properties of Alkyl, Fluorinated Alkyl, and Alkoxy Monolayers on Silicon", Langmuir, vol. 17, pp. 3460-3465, May 5, 2001.
Chable, Johann, et al., "Fluoride solid electrolytes: investigation of the tysonite-type solid solutions a1-xBaxF3-x (x <0.15)", Dalton Transactions; 2015, 44, pp. 19625-19635.
Paul, Subir, "Materials and Electrochemistry: Present and Future Battery", Journal of Electrochemical Science and Technology, 2016, 7(2), pp. 115-131, DOI: http://dx.doi.org/10.5229/JECST.2016.7.2.115.
McKenney, Ryan K., (2017) "Emerging Therapeutics for Organophosphorus Nerve Agent Poisonings. The Development of a Fluoride Ion Battery System Utilizing Nanoparticles", Dissertation, The Ohio State University.

* cited by examiner

ELECTROACTIVE MATERIALS MODIFIED WITH MOLECULAR THIN FILM SHELL

CROSS-REFERENCE TO RELATED APPLICATION

This application claims priority to U.S. Provisional Application No. 62/775,748, filed Dec. 5, 2018, the disclosures of which is expressly incorporated herein by reference.

STATEMENT REGARDING FEDERALLY SPONSORED RESEARCH OR DEVELOPMENT

This invention was made with government support under Grant Number 80NMO0018D0004, awarded by NASA (JPL). The government has certain rights in the invention.

TECHNICAL FIELD

The present disclosure is directed generally to an electrochemically active structure for use as an electrode material in liquid type F-shuttle batteries.

BACKGROUND OF THE DISCLOSURE

Electrodes, particularly cathodes, in liquid type F-shuttle batteries often comprise metal materials. However, dissolution of the metal material into the liquid electrolyte of the battery limits the use of such materials. Recently, structures comprising a metal material core and a shell made from thin films of solid-state ionic conductors have been researched to protect the metal material from dissolution.

BRIEF DESCRIPTION OF THE DISCLOSURE

However, shell materials made from thin films of solid-state ionic conductors that can limit the functionality of the metal material, for example, by providing unacceptably slow charge and discharge due to high ionic resistance. There is thus a need in the art for electrochemically active structures useful in liquid type F-shuttle batteries that reduce and/or eliminate these drawbacks.

The present disclosure is directed generally to an electrochemically active structure comprising a core and a shell at least partially surrounding the core, wherein the core comprises an electrochemically active material and the shell comprises a shell material such as a thin film made from molecular species. The present disclosure is also directed to a method of making the electrochemically active structure as described herein as well as electrochemical cells comprising the electrochemically active structure as described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE DISCLOSURE

Figure 1A:
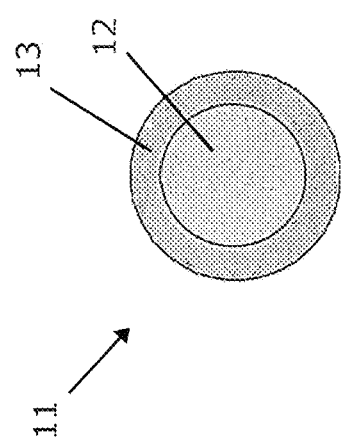
FIG. 1A shows an example electrochemically active structure according to aspects of the present disclosure.

The present disclosure is directed generally to an electrochemically active structure comprising a core and a shell at least partially surrounding the core, wherein the core comprises an electrochemically active material and the shell comprises a shell material. The present disclosure is also directed to a method of making the electrochemically active structure as described herein as well as electrochemical cells comprising the electrochemically active structure as described herein.

The electrochemically active structure as described herein comprises a core, wherein the core comprises an electrochemically active material. As used herein, the term "electrochemically active material" refers to a material capable of acting as an electrode in a primary or secondary electrochemical cell, for example, in an ion battery system. According to some aspects, the electrochemically active material may comprise a material capable of acting as a cathode in a liquid type fluoride (F) shuttle battery. It should be understood that a liquid type F-shuttle battery utilizes fluoride ion charge carriers as an alternative to, for example, lithium ions in conventional state of the art lithium batteries and lithium ion batteries. Liquid type F-shuttle batteries may further comprise active electrode materials and/or suitable liquid electrolytes. According to some aspects, liquid type F-shuttle batteries may comprise an anode and a cathode physically separated from each other and in common contact with a fluoride ion conducting electrolyte. The anode may comprise a low potential element or compound (e.g., a metal, metal fluoride, and/or intercalating composition). The cathode may comprise an element or composition (e.g., a metal, metal fluoride, and/or intercalating composition) that has a higher potential than the anode. According to some aspects, fluoride ions ($F^-$) in the fluoride conducting electrolyte may travel from the cathode to the anode during discharge and from the anode to the cathode during the charge of the battery.

According to some aspects, the electrochemically active material according to the present disclosure may be a lightweight material which provides high capacity and high energy densities. Examples of electrochemically active materials useful according to the present disclosure include, but are not limited to, metals such as copper (Cu), iron (Fe), lead (Pb), bismuth (Bi), cobalt (Co), tin (Sn), lanthanum (La), cerium (Ce), calcium (Ca), magnesium (Mg), lithium (Li), alloys thereof, oxides, fluorides thereof, and combinations thereof. According to some aspects, the electrochemically active material comprises copper, copper (II) fluoride ($CuF_2$), or a combination thereof.

According to some aspects, the core may have a selected shape. For example, the core may comprise a nanoparticle (e.g., a spherical nanoparticle), nanotube, nanowire, frame, flake, nanoporous sheet, thin film, foam, or a combination thereof. According to some aspects, the size of the core may be determined either by electron conductivity or $F^-$ ion mobility. In an illustrative example, 20 nm may be the distance limit of $F^-$ ion penetration in the core material. If the path of either an electron or $F^-$ ion is greater than this distance limit (in this example, 20 nm), electron conductivity and/or $F^-$ ion mobility will be reduced or prevented. As such, according to some aspects, the core may comprise at least one dimension that is less than or equal to about the distance limit. For example, the core may comprise a spherical nanoparticle having a diameter of less than or equal to about the distance limit, as such a spherical nanoparticle will provide a pathway for an electron or $F^-$ ion that is less than or equal to about the distance limit in all directions. It should be understood that the core may have one or more dimensions that are greater than about the distance limit so long as it has a pathway of about the distance limit or less in at least one direction. For example, the core may comprise a flake having dimensions in the X and Y directions of greater than about the distance limit and a dimension in the Z direction of less than or equal to about the distance limit. According to some aspects, the distance limit may be about 20 nm, optionally about 30 nm, optionally about 40 nm, and optionally about 50 nm. According to some aspects, the distance limit may be between about 20 and 80 nm, optionally between about 30 and 70 nm, and optionally between about 40 and 60 nm. According to some aspects, the distance limit corresponds at least in part to certain aspects of the electrochemically active structure, for example, its shell. In particular, a shell having a relatively low ionic resistance will provide for a longer distance limit as $F^-$ ions are more easily able to traverse the shell to the core.

Examples of cores useful according to the present disclosure include, but are not limited to, a nanoparticle with a diameter of less than or equal to about the distance limit, a nanowire with at least one dimension of less than or equal to about the distance limit, a nanotube having a wall thickness of less than or equal to about the distance limit, a flake (e.g., a triangle, rectangle, square, circle, or oval) having a thickness of less than or equal to about the distance limit, a film having a thickness of less than or equal to about the distance limit, a foam having a pore wall thickness of less than or equal to about the distance limit, a sheet having a thickness of less than or equal to about the distance limit, a frame having a thickness of less than or equal to about the distance limit, a mesh having a wire thickness of less than or equal to about the distance limit, and combinations thereof.

The electrochemically active structure further comprises a shell that at least partially surrounds the core. For example, the shell may surround the core such that at least about 50% of the core's surface area is covered by the shell, optionally at least about 60%, optionally at least about 70%, optionally at least about 80%, optionally at least about 90%, optionally at least about 95%, and optionally at least about 100%. According to some aspects, the molecular coverage of the shell on the core may be between about 1 and 100 $nm^{-2}$, optionally between about 6 and 60 $nm^{-2}$.

According to some aspects, the shell may comprise a shell material that is compatible with a liquid type F-shuttle battery.

For example, the shell material may be selected such that dissolution of the core material into the liquid electrolyte of the liquid type F-shuttle battery during charge and/or discharge may be reduced or eliminated. The shell material may be selected to further provide adequate charge time. As used herein, the term "charge time" refers to the length of time required for a discharged liquid type F-shuttle battery electrode to fully charge, that is, the length of time required for $F^-$ in the fluoride conducting electrolyte to travel from the anode to the cathode during the charge of the battery. According to some aspects, the charge time may be between about 1 and 20 minutes, optionally been about 1 and 10 minutes, and optionally between about 3 and 5 minutes.

It should be understood that the charge time may be depend on one or more characteristics of the electrochemically active structure. For example, charge/discharge of an electrochemically active structure comprising a solid material shell with high ionic resistance may require very low currents (e.g., equal to or less than about 10 μA, or a current density of around 2.5 mA/g). Such electrochemically active structures may thus require unacceptable charge times. It should also be understood that charge/discharge of an electrochemically active structure comprising a shell material with a relatively low ionic resistance may be accomplished using higher currents, at least in part due to the relative ease with which ions (e.g., F⁻ ions) may traverse the shell material. According to some aspects, the shell material may be selected such that charge/discharge of a cathode comprising the electrochemically active structure may be accomplished with a current of at least about 50 µA, optionally at least about 75 µA, optionally at least about 100 µA, optionally at least about 150 µA, optionally at least about 200 µA, optionally at least about 250 µA, and optionally at least about 300 µA.

According to some aspects, the shell material may be selected in order to acceptably utilize the electrochemically active material comprised by the core during charge and/or discharge. It should be understood that utilization refers to the portion of the electrochemically active material that accepts F⁻ ions during charging and/or the portion of the electrochemically active material that is reduced during discharging. According to some aspects, by selecting a shell material having a relatively low ionic resistance as described herein, at least about 50% of the electrochemically active material may be utilized during charge and/or discharge, optionally at least about 60%, optionally at least about 70%, optionally at least about 80%, optionally at least about 90%, and optionally at least about 100%.

According to some aspects, the shell material may comprise a "soft shell" material. As used herein, "soft" refers to a material as described herein, and in particular, a material that includes at least one material capable of self-assembly as described herein. Examples of soft shell materials include, but are not limited to, surfactants, certain polymers, a non-surfactant molecule having one or more specific functional groups, and combinations thereof. According to some aspects, the shell material may comprise an organic material, and in particular, an organic material that includes at least one material capable of self-assembly as described herein. Examples of organic shell materials include, but are not limited to, organic soft shell materials such as organic surfactants, organic or organic molecule-containing polymers, non-surfactant organic molecules having one or more specific functional groups, and combinations thereof.

According to some aspects, the specific functional groups as described herein may be selected from the group consisting of —COOH, —NH₂, —COH, —OH, —SH, —PO₃H, —SO₃H, —CN, —NC, —R₂P, —COO⁻, —COO—OOCR, ene-diol, —C≡N, —N≡N⁺(BF₄⁻), —Sac, —SR, —SSR, —CSSH, —S₂O₃⁻Na⁺, —SeH, —SeSeR, —R₂P=O, —PO₃²⁻/—P(O)(OH)₂, —PO₄²⁻, —N≡C, —HC=CH₂, —C≡CH, —SiH₃, —SiCl₃, —OCH₂CH₃, formula (I), formula (II), formula (III), and combinations thereof, wherein formula (I) is:

formula (I)

formula (II) is:

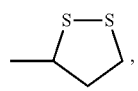

formula (II)

and formula (III) is:

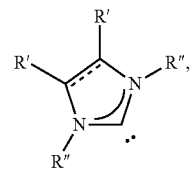

formula (III)

wherein R' and R" are each independently an organic chain, particularly an organic chain capable of being partially or fully fluorinated, or an aromatic group, either alone or in combination with another R' or R", particularly an aromatic group substituted with one or more fluorophilic groups. Example organic chains useful for R' and R" include, but are not limited to, —(CF₂)ₙCF₃, (CH₂CF₂)nCF₃, and (CF₂CH₂O)ₙCF₃. Examples of functional groups according to formula (III) having at least one aromatic group are shown below as formula (IV):

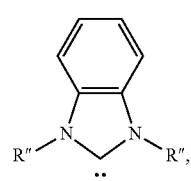

formula (IV)

and as formula (V):

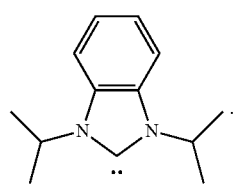

formula (V)

It should be understood that each R' and R" may be the same as another R' or R", or may be different. According to some aspects, each R' may show acceptable fluorination characteristics and/or each R" may show acceptable stabilization characteristics. It should further be understood that the carbon atom having the unshared valence electrons in the carbene shown in formula (III) may be configured for attachment to one or more molecules comprised by the core, as described herein. Example materials comprising a functional group having formula (III) include those described in Smith et al., "N-Heterocyclic Carbenes in Materials Chemistry." *Chem. Rev.*, 2019, 119, 4986-5056, which is incorporated herein by reference in its entirety.

According to some aspects, the surfactant may comprise a surfactant useful for preparing the core as described herein, such as a surfactant having one or more functional groups selected from the group consisting of a polar head (e.g., a polar head comprising one or more of the specific functional groups as described herein), a carbon-containing tail (e.g., alkanes, alkynes, alkenes, and aromatic rings), a fluorocarbon-containing tail (e.g., aliphatic chains such as (CF₂)ₙ, (CHF)ₙ, (CH₂CF₂)ₙ, and (CH₂OCH₂CF₂)ₙ, and/or aromatic groups such as $(C_{6-x}F_x—)_n)$, and combinations thereof. Examples of surfactants useful according to the present disclosure may include, but are not limited to, oleylamine, oleic acid, tris(trimethylsilyl)silane, 3,3,4,4,5,5,6,6,7,7,8,8,9,9,10,10,10-heptadecafluorodecanethiol, 2-(trifluoromethoxy)-benzenethiol, P-[12-(2,3,4,5,6-pentafluorophenoxy)dodecyl]-Phosphonic acid, P-(3,3,4,4,5,5,6,6,7,7,8,8,9,9,10,10,10-heptadecafluorodecyl)-Phosphonic acid, pentafluorobenzylphosphonic acid, perfluorododecanoic acid and combinations thereof. According to some aspects, the surfactant may comprise one or more surfactants useful in the production of the core.

According to some aspects, the certain polymers may comprise polymers capable of being formed via in-situ polymerization, particularly polymers capable of being formed via in-situ polymerization from their monomers or from shorter oligomeric species. Additionally or alternatively, the certain polymers may be capable of self-healing through hydrogen bonding. For example, the certain polymers may be capable of hydrogen bonding so as to autonomously and repeatedly "self-heal" imperfections in the shell, such as cracks and/or gaps that may result at least in part from volume expansion and/or contraction of the core during charge and discharge, as will be discussed in more detail below in regard to FIG. 2. Examples of such polymers include, but are not limited to, polyvinylpyrrolidone (PVP), poly(methyl methacrylate) (PMMA), amino-terminated, C=O bond included cross linked polymers (P. Cordier, F. Tournilhac, C. Soulie-Ziakovic, L. Leibler, *Nature* 451, 977, (2008); B. C. Tee, C. Wang, R. Allen, Z. Bao, *Nat Nanotechnol* 7, 825, (2012)), and combinations thereof.

According to some aspects, the shell may comprise one or more monolayers. According to some aspects, the shell may comprise one, two, three, or more monolayers. According to some aspects, each of the monolayers may be the same or different.

FIG. 1A shows an example electrochemically active structure 11 according to aspects of the present disclosure. As show in FIG. 1A, the electrochemically active structure 11 may comprise a core 12 as described herein and a monolayer 13 comprising a shell material as described herein. According to some aspects, the monolayer 13 may be, for example, a self-assembled monolayer (SAM) comprising a surfactant as described herein. It should be understood that in this example, monolayer 13 corresponds to the shell as described herein.

Figure 1B:
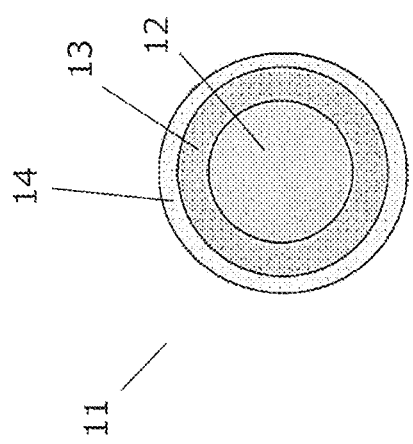
FIG. 1B shows an example electrochemically active structure according to aspects of the present disclosure.

FIG. 1B shows an example electrochemically active structure 11 comprising a core 12 as described herein and a monolayer 13 comprising a shell material as described herein. FIG. 1B also shows a second monolayer 14 covering at least a portion of the first monolayer 13. The second monolayer 14 may also be a SAM that is either the same or different from the first monolayer 13. It should be understood that in this example, the first monolayer 13 and the second monolayer 14 may together correspond to the shell as described herein.

Figure 1C:
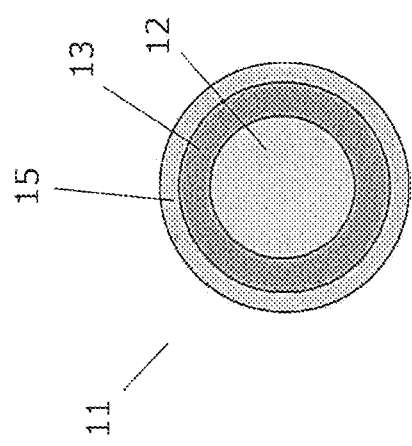
FIG. 1C shows an example electrochemically active structure according to aspects of the present disclosure.

FIG. 1C shows an example electrochemically active structure 11 comprising a core 12 as described herein and a monolayer 13 comprising a shell material as described herein. FIG. 1C also shows a polymer layer 15 covering at least a portion of the monolayer 13. The polymer layer 15 may comprise any of the polymers as described herein. It should be understood that in this example, the monolayer 13 and the polymer layer 15 may together correspond to the shell as described herein.

It should be understood that while FIGS. 1A-C show certain example shell configurations, the electrochemically active structure may comprise a shell having a different configuration. For example, the shell may comprise more than two SAMs and/or more than one polymer layer, wherein the position of the SAMs and/or polymer layer are in any arrangement with respect to each other.

Figure 2:
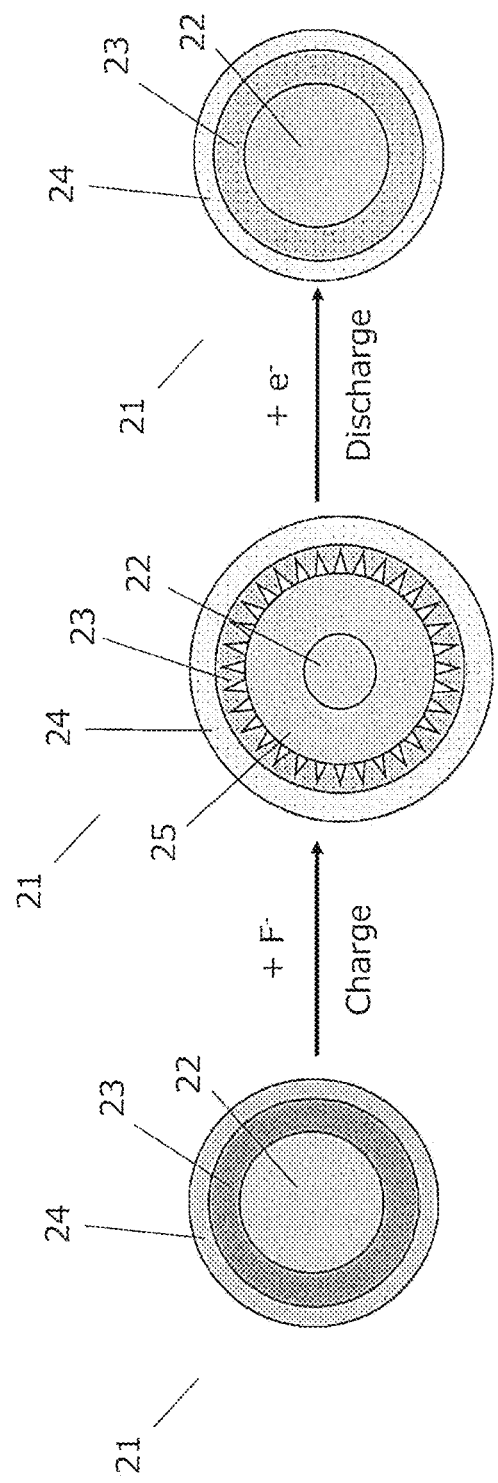
FIG. 2 shows an example schematic of charging and discharging an electrochemically active structure according to aspects of the present disclosure.

According to some aspects, the shell may be configured to accommodate the volume change of the electrochemically active material between charged and discharged states. For example, FIG. 2 shows an example schematic of charging and discharging an electrochemically active structure 21 as described herein. As shown in FIG. 2, the electrochemically active structure 21 may comprise a core 22 and a shell comprising a SAM 23 and a polymer layer 24 as described herein. The core may comprise any core as described herein, for example, a Cu core. FIG. 2 shows a schematic of charging the electrochemically active structure 21, e.g., when $F^-$ ions travel to a cathode comprising the electrochemically active structure 21. As shown in FIG. 2, $F^-$ ions are able to traverse the shell to the core 22 such that at least a portion of the Cu core 22 is converted to $CuF_2$ 25. As the Cu in the Cu core 22 is converted to $CuF_2$ 25, the volume of the core may expand. Without wishing to be bound by theory, as the volume of the core expands, SAM 23 may defect or crack, thereby accommodating the change in volume. As shown in FIG. 2, as the electrochemically active structure 21 is discharged, the $CuF_2$ 25 may be reduced back to Cu 22, and the volume of the core may contract. As the volume contracts, the SAM 23 may self-assemble or "self-heal" to its original configuration.

Figure 3:
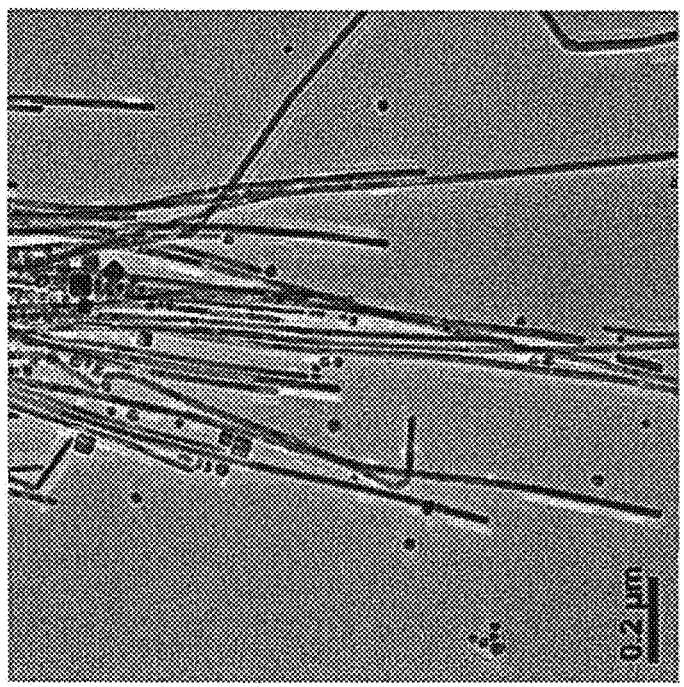
FIG. 3 shows an example transmission electron microscope (TEM) image of an electrochemically active structure according to aspects of the present disclosure.

FIG. 3 shows an example transmission electron microscope (TEM) image of an electrochemically active structure according to aspects of the present disclosure. In particular, FIG. 3 shows a nanowire having a shell as described herein.

The present disclosure is also directed to a method of making the electrochemically active structure as described herein. According to some aspects, the method may comprise a one-step synthetic strategy. As used herein, the term "one-step synthetic strategy" refers to a synthetic strategy wherein at least a first reactant is converted to a reaction product in a single synthesis step. For example, the core and the shell as described herein may be prepared in a single synthesis step. The synthesis step may comprise combining a solution containing a metal salt and/or a hydrate thereof and one or more shell materials at an elevated temperature for a certain period of time to provide an electrochemically active structure. According to some aspects, the elevated temperature may be at least about 90° C., optionally at least about 100° C., optionally at least about 110° C., optionally at least about 120° C., optionally at least about 130° C., optionally at least about 140° C., optionally at least about 150° C., optionally at least about 160° C., and optionally at least about 165° C. According to some aspects, the selected period of time may be about 5 minutes, optionally about 30 minutes, optionally about 1 hour, optionally about 2 hours, optionally about 6 hours, optionally about 12 hours, optionally about 18 hours, and optionally about 24 hours. According to some aspects, the "one-step synthetic strategy" may comprise two or more heating periods, for example, a first heating period at a first elevated temperature as described herein for a first period of time as described herein, followed by a second heating period at a second elevated temperature as described herein for a second period of time as described herein. The first and second elevated temperatures may be the same or different, and the first and second periods of time may be the same or different.

Figure 15:
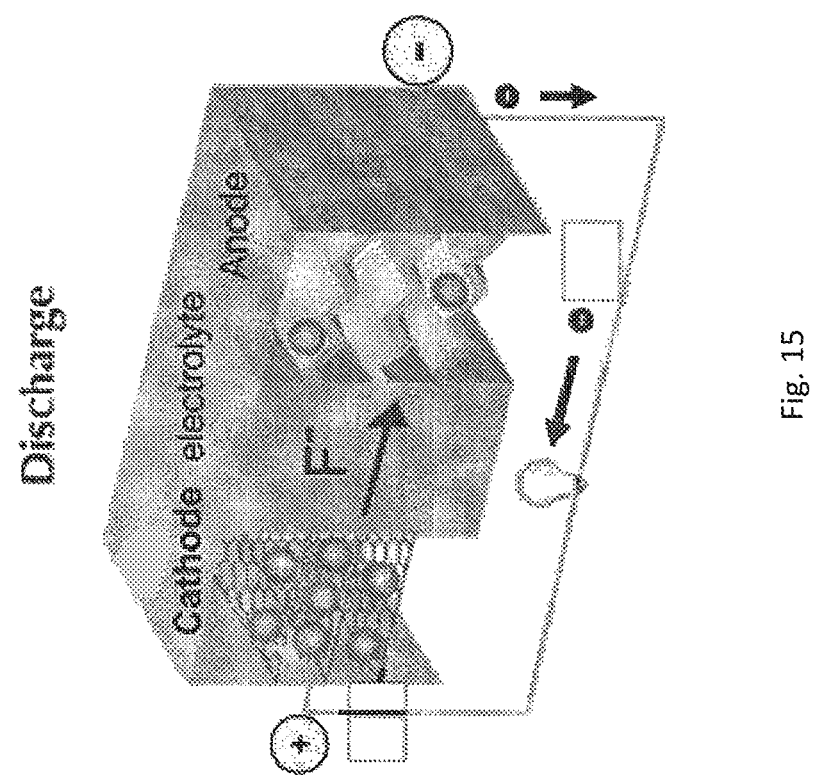
FIG. 15 shows a schematic illustration of an example electrochemical cell according to aspects of the present disclosure.

The present disclosure is also directed to electrochemical cells comprising the electrochemically active structure as described herein. According to some aspects, the electrochemical cell may be a liquid type F-shuttle battery comprising a cathode, an anode, and a suitable liquid electrolyte. Examples of suitable liquid electrolytes useful according to the present disclosure include, but are not limited to, those described in U.S. Patent Publication No. 2017/0062874, the entirety of which is incorporated herein by reference. In that regard, FIG. 15 shows a schematic illustration of an example electrochemical cell according to aspects of the present disclosure, specifically an example electrochemical cell during discharge. As shown in FIG. 15, the direction of the flow of electrons during discharge is from the negative electrode to the positive electrode. During charging of a fluoride ion electrochemical cell, fluoride anions are released from the negative electrode migrate through the electrolyte and are accommodated by the positive electrode. The direction of the flow of electrons during charging is from the positive electrode to the negative electrode. Release and accommodation of fluoride ions during discharge and charging results from oxidation and reduction reactions occurring at the electrodes. According to some aspects, the cathode may comprise the electrochemically active structure as described herein.

A "metal salt" is an ionic complex wherein the cation(s) is(are) a positively charged metal ion(s) and the anion(s) is(are) a negatively charged ion(s). "Cation" refers to a positively charged ion, and "anion" refers to a negatively charged ion. In a "metal salt" according to the present disclosure, the anion may be any negatively charged chemical species. Metals in metal salts according to the present disclosure may include but are not limited to alkali metal salts, alkaline earth metal salts, transition metal salts, aluminum salts, or post-transition metal salts, and hydrates thereof.

The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e., higher than the negative electrode).

"Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive and negative electrodes of the present invention may be provided in a range of useful configurations and form factors as known in the art of electrochemistry and battery science, including thin electrode designs, such as thin film electrode configurations. Electrodes are manufactured as known in the art, including as disclosed in, for example, U.S. Pat. No. 4,052,539, and Oxtoby et al., Principles of Modern Chemistry (1999), pp. 401-443.

The term "electrochemical cell" refers to devices and/or device components that convert chemical energy into electrical energy or vice versa. Electrochemical cells have two or more electrodes (e.g., positive and negative electrodes) and an electrolyte, wherein electrode reactions occurring at the electrode surfaces result in charge transfer processes. Electrochemical cells include, but are not limited to, primary batteries, secondary batteries, and electrolysis systems. General cell and/or battery construction is known in the art (see, e.g., Oxtoby et al., Principles of Modern Chemistry (1999), pp. 401-443).

"Electrolyte" refers to an ionic conductor which can be in the solid state, the liquid state (most common), or more rarely a gas (e.g., plasma).

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

As used herein, the term "about" and "approximately" are defined to being close to as understood by one of ordinary skill in the art. In one non-limiting embodiment, the term "about" and "approximately" are defined to be within 10%, preferably within 5%, more preferably within 1%, and most preferably within 0.5%.

Moreover, all references throughout this application, for example patent documents including issued or granted patents or equivalents; patent application publications; and non-patent literature documents or other source material; are hereby incorporated by reference herein in their entireties, as though individually incorporated by reference.

EXAMPLES

Example I: Preparation of Electrochemically Active Structure

A solution of $CuCl_2 \cdot 2H_2O$ (85 mg, 0.5 mmol) in oleylamine (5 g, 18.7 mmol) and oleic acid (0.1 g, 0.354 mmol) was sonicated in a glass vial until completely dissolved. Tris(trimethylsilyl)silane (0.5 g, 2.0 mmol) was added, and the mixture was heated up to 120° C. until the dark blue solution turned clear yellow. The mixture was heated further to 165° C. for 18 hours (e.g., as described in Cui F, Yu Y, Dou L, et. al. Nano Letters 2015, 15, 7610-7615, the entirety of which is incorporated herein by reference). The resulting copper nanowires with a shell were isolated via centrifuge (12,000 rpm for 10 minutes) and washed two times with toluene and with ethanol (10 mL).

Example II: Thermal Gravimetric Analysis (TGA) and X-Ray Photoelectron Spectroscopy (XPS) Analysis of Electrochemically Active Structure An electrochemically active structure was prepared according to Example I, and the structure was analyzed over a temperature range from about 0° C. to about 800° C. using thermal gravimetric analysis (TGA) and using X-ray Photoelectron Spectroscopy (XPS).

Figure 11:
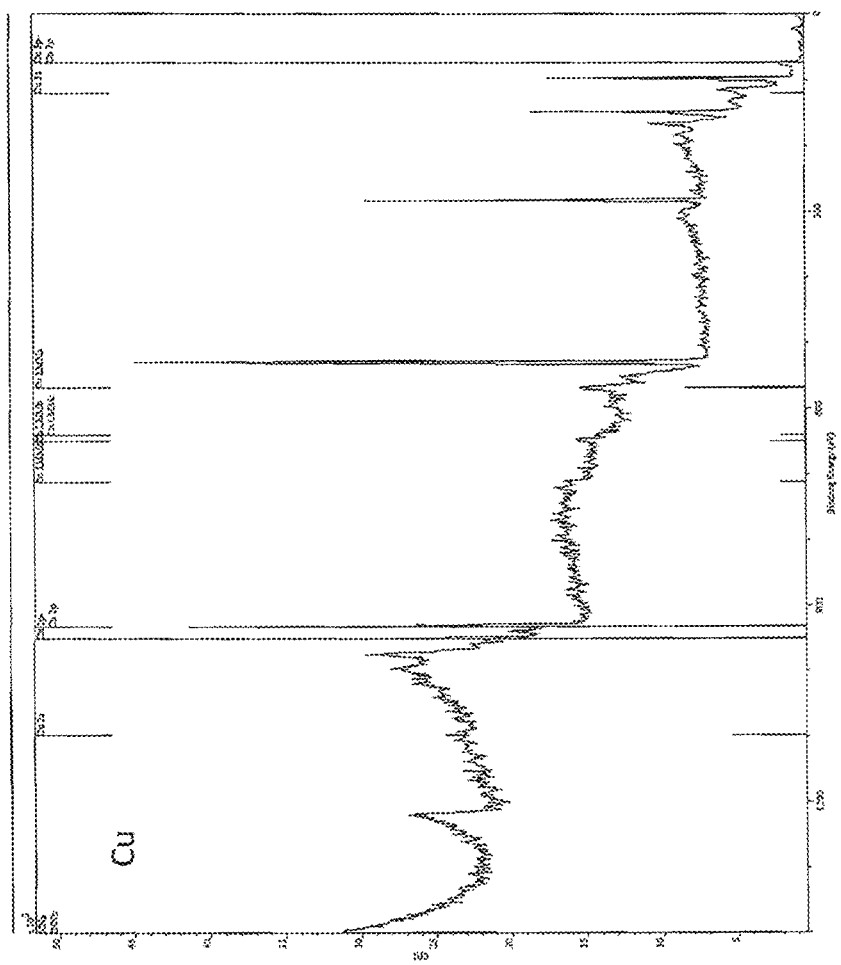
FIG. 11 shows an XPS spectrum of copper core in the electrochemically active structure prepared according to Example I.
Figure 12:
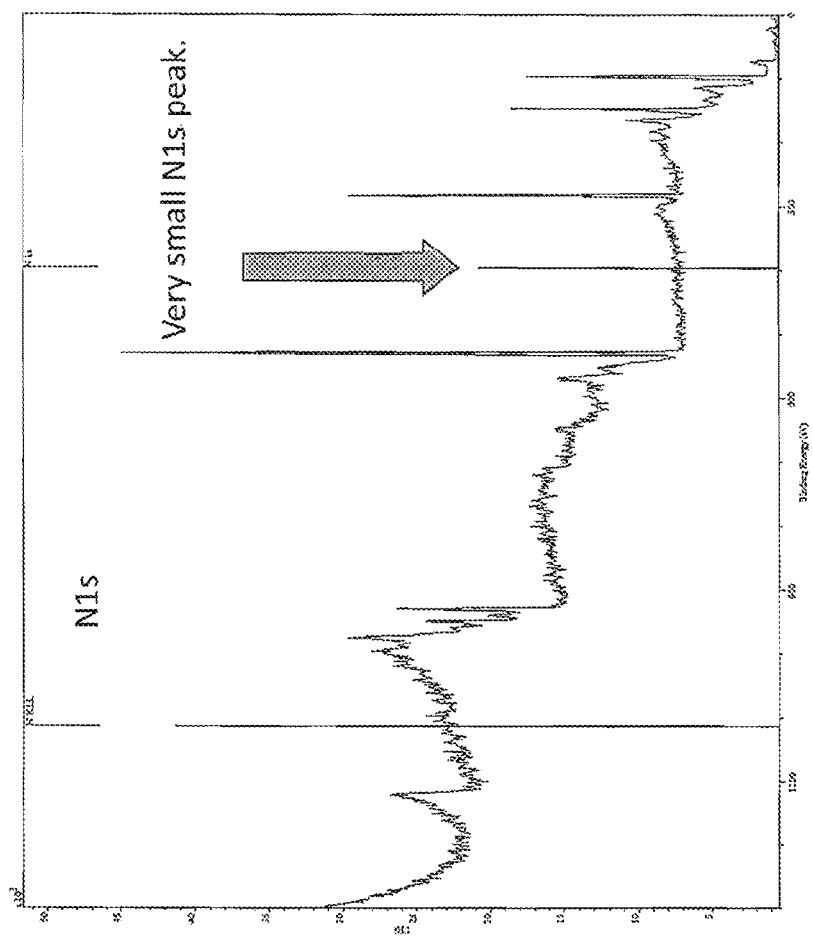
FIG. 12 shows an XPS spectrum of nitrogen from shell materials in the electrochemically active structure prepared according to Example I.
Figure 13:
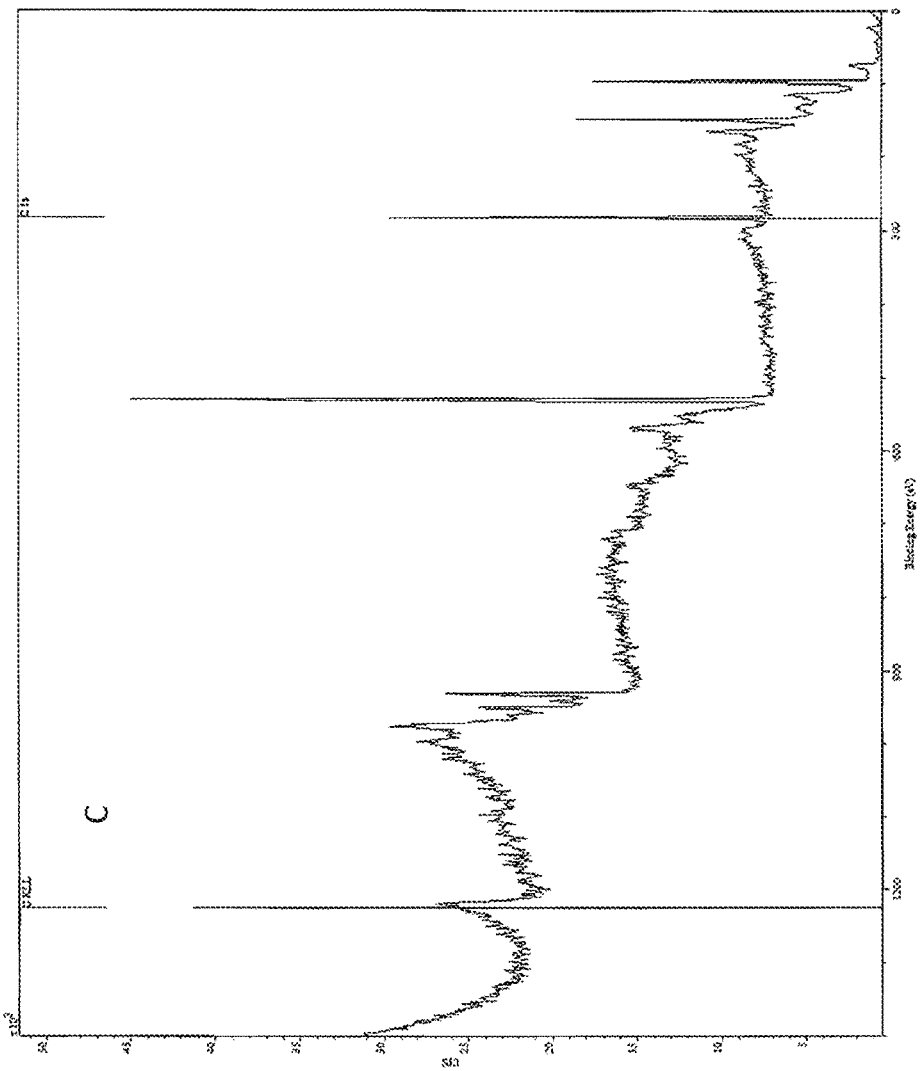
FIG. 13 shows an XPS spectrum of carbon from shell materials in the electrochemically active structure prepared according to Example I.
Figure 14:
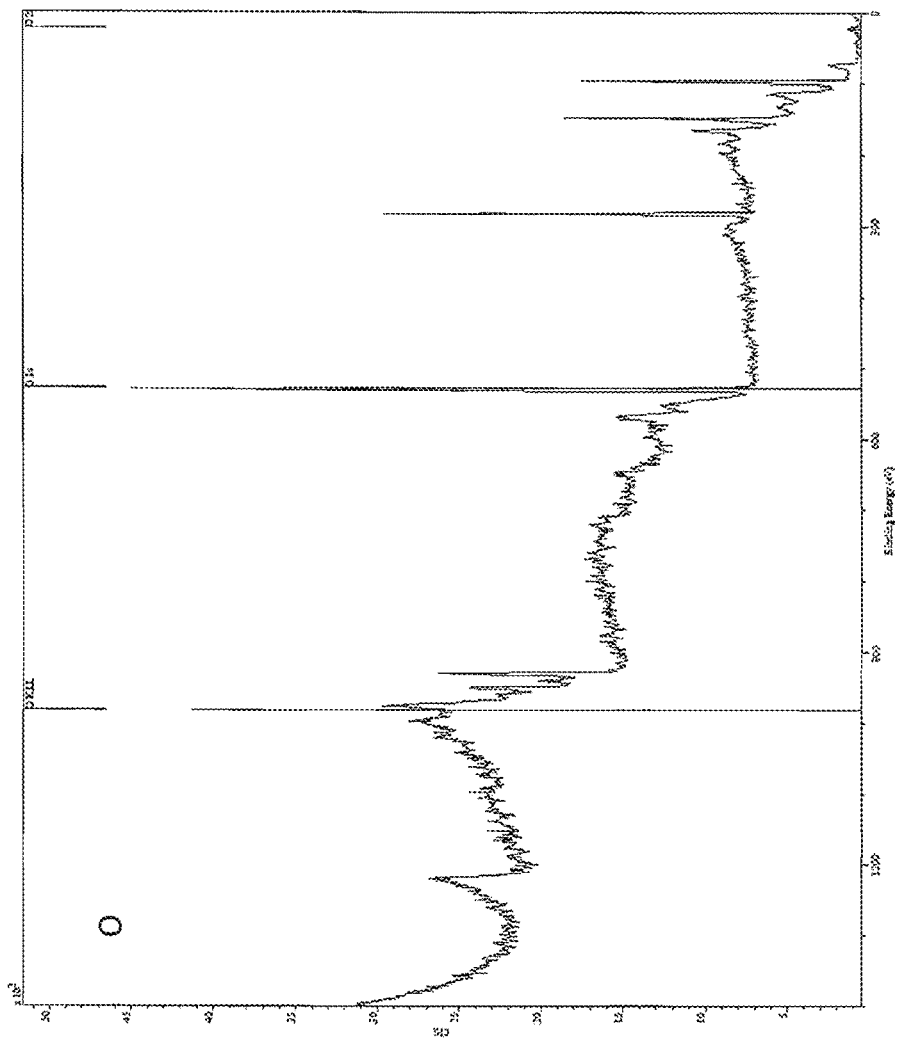
FIG. 14 shows an XPS spectrum of oxygen from shell materials in the electrochemically active structure prepared according to Example I.

FIGS. 11-14 show the XPS spectra corresponding to the electrochemically active structure prepared according to Example I. Specifically, FIG. 11 shows an XPS spectrum of the copper core in the electrochemically active structure prepared according to Example I. FIG. 12 shows an XPS spectrum of the nitrogen from shell materials in the electrochemically active structure prepared according to Example I. FIG. 13 shows an XPS spectrum of the carbon from shell materials in the electrochemically active structure prepared according to Example I. FIG. 14 shows an XPS spectrum of the oxygen from shell materials in the electrochemically active structure prepared according to Example I.

Figure 4:
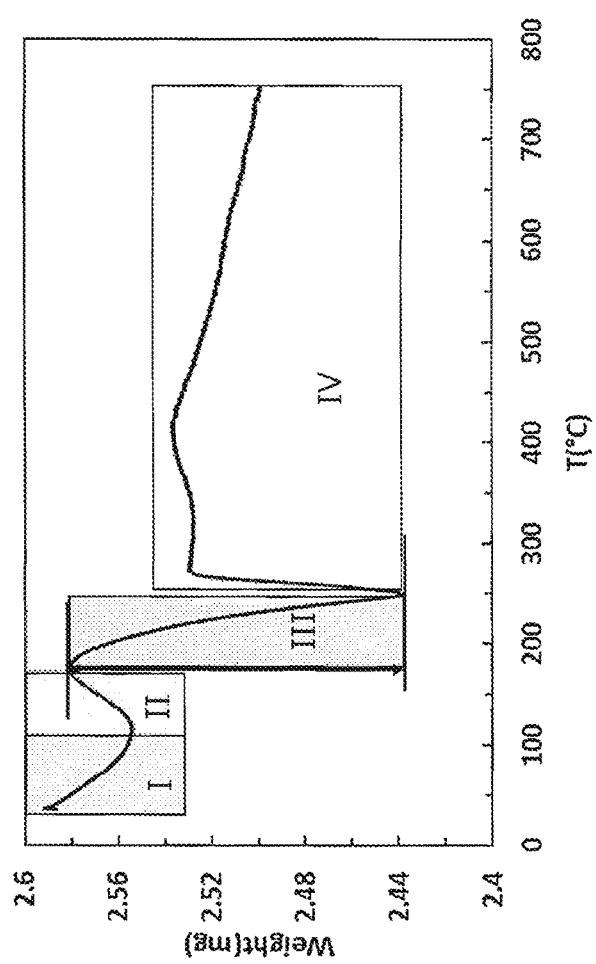
FIG. 4 shows a thermal gravimetric analysis (TGA) plot as described in Example II.

FIG. 4 shows the resulting TGA plot. In particular, FIG. 4 shows the following phases over the studied temperature range: I. Desorption of the gas adsorbed on the shell and electrochemically active material (i.e., the copper nanowire) surface; II. Air adsorbed on the shell and electrochemically active material surface; III. "Burning off" of the shell, and IV. Electrochemically active material (i.e., copper) oxidation. In particular, phase III shows a weight loss that indicates that a weight percentage of the shell with respect to the electrochemically active structure is about 5.5% (w/w). Molecular coverage on the surface was determined to be about 6 $nm^{-2}$.

Based on TGA and XPS analyses, it was concluded that the shell comprised mainly oleylamine or/and oleic acid.

Figure 10:
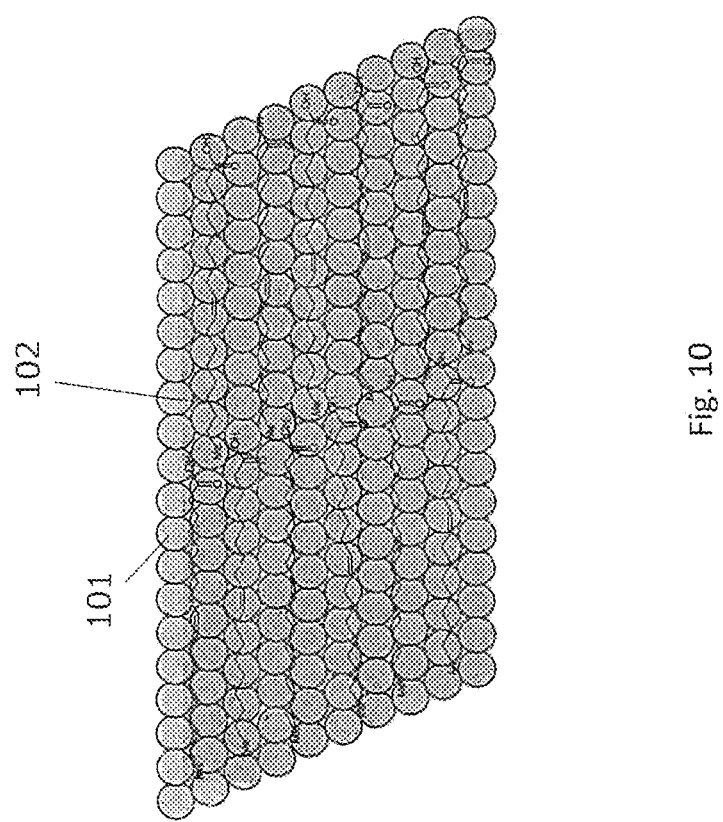
FIG. 10 shows an example schematic of a shell on the copper nanowire surface as prepared according to Example I.

FIG. 10 shows an example schematic of a shell 102 on the copper nanowire 101 surface as prepared according to Example I. In this example schematic, a (111) copper surface was assumed with an area of 4 $nm^2$. The molecular length is between about 1.5 and 1.8 nm, and the copper atom diameter is about 0.145 nm. In this example, the initial weight of the electrochemically active structure was about 2.587 mg and the residue weight (mainly copper oxides) was about 2.4385 mg.

Example III: Charge/Discharge of Electrochemically Active Structure

An electrochemically active structure was prepared according to Example I and was provided as part of a three-electrode cell. In particular, the electrochemically active structure was provided as part of a working electrode along with super P carbon black (SP) and polyvinylidene fluoride (PVDF) in a weight ratio of about 8:1:1. The cell also comprised a reference electrode made of silver wire in 0.01M sliver trifluoromethanesulfonate (AgOTf) in 1-methyl-1-propylrrolidinium bis(trifluoromethylsulfonyl)imides (MPPyTFSI) and a counter electrode made of a platinum wire. The cell comprised a 1M N,N,N-trimethyl-N-neopentylammonium fluoride ($NpMe_3NF$) in bis(2,2,2-trifluoroethyl) ether (BTFE) electrolyte.

Figure 5:
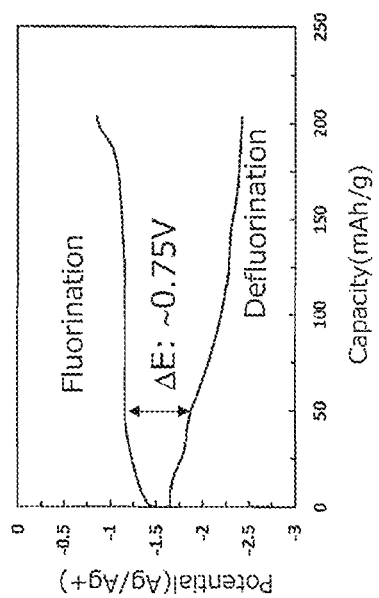
FIG. 5 shows a capacity vs. potential chart according to Example III.
Figure 6:
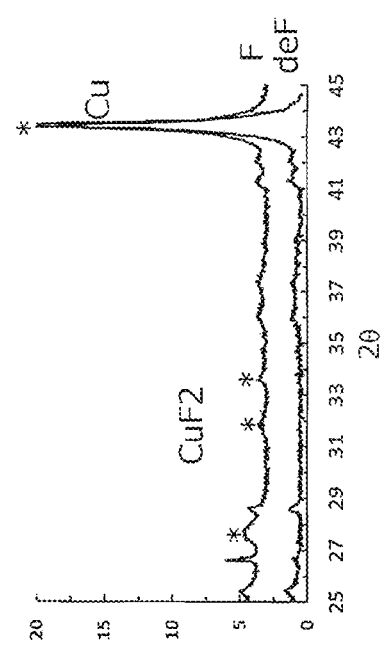
FIG. 6 shows an X-ray powder diffraction (p-XRD) pattern according to Example III.

FIG. 5 represents the charge/discharge of the electrochemically active structure at a low current (i.e., about 10 µA). As shown in FIG. 5, a high practical capacity (i.e., 203 mAh/g) was achieved. FIG. 6 shows the X-ray powder diffraction (p-XRD) patterns corresponding to the electrochemically active structure after charge (i.e., fluorination) and discharge (i.e., defluorination). As shown in FIG. 6, copper turns into $CuF_2$ after charge, whereas $CuF_2$ is reduced to copper after discharge. It was thus concluded that copper may be reversibly charged with shell protection.

Figure 7:
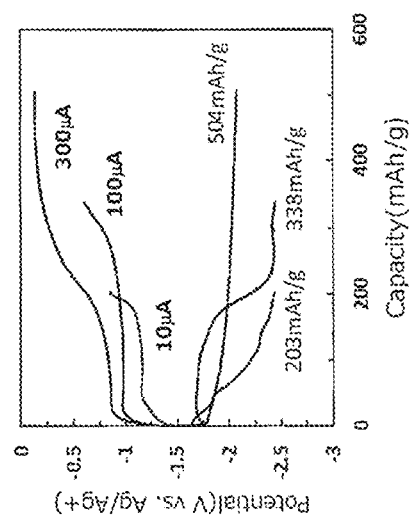
FIG. 7 shows a capacity vs. potential chart according to Example IV.

Example IV: Charge/Discharge of Electrochemically Active Structure Using Various Currents A three-electrode cell was prepared as described in Example III, and the charge/discharge at three different currents was studied, specifically at currents of 10 µA, 100 µA, and 300 µA. As shown in FIG. 7, the electrochemically active structure was able to be charged and discharged at both a low current density (i.e., 10 µA) and at high current densities (i.e., 100 µA and 300 µA). This result was surprising, as some electrochemically active structures containing copper with shells known in the art have been known to charge and discharge only at low current densities due to high ionic resistance of the shell.

Figure 8:
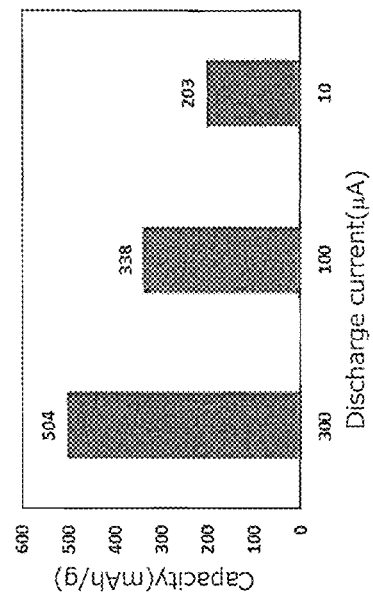
FIG. 8 shows a capacity vs. discharge current chart according to Example IV.

FIG. 8 shows the capacity of the electrochemically active structure at the three currents of charge/discharge studied. As shown in FIG. 8, high capacity was achieved at all currents. Specifically, a capacity of 203 mAh/g was reached with a current of 10 µA, a capacity of 338 mAh/g was reached with a current of 100 µA, and a capacity of 504 mAh/g was reached with a current of 300 µA. It should be noted that the capacity reached at 300 µA was close to the theoretical capacity of $CuF_2$, that is, 528 mAh/g. This was surprising given that some electrochemically active structures containing shells known in the art have been known to provide a capacity of around 50 mAh/g (at 10 µA), while other electrochemically active structures have been shown to provide a capacity of around 180 mAh/g at 10 µA. Surprisingly, the electrochemically active structure according to the present disclosure provides both fast charge and discharge along with a high practical capacity.

Figure 9:
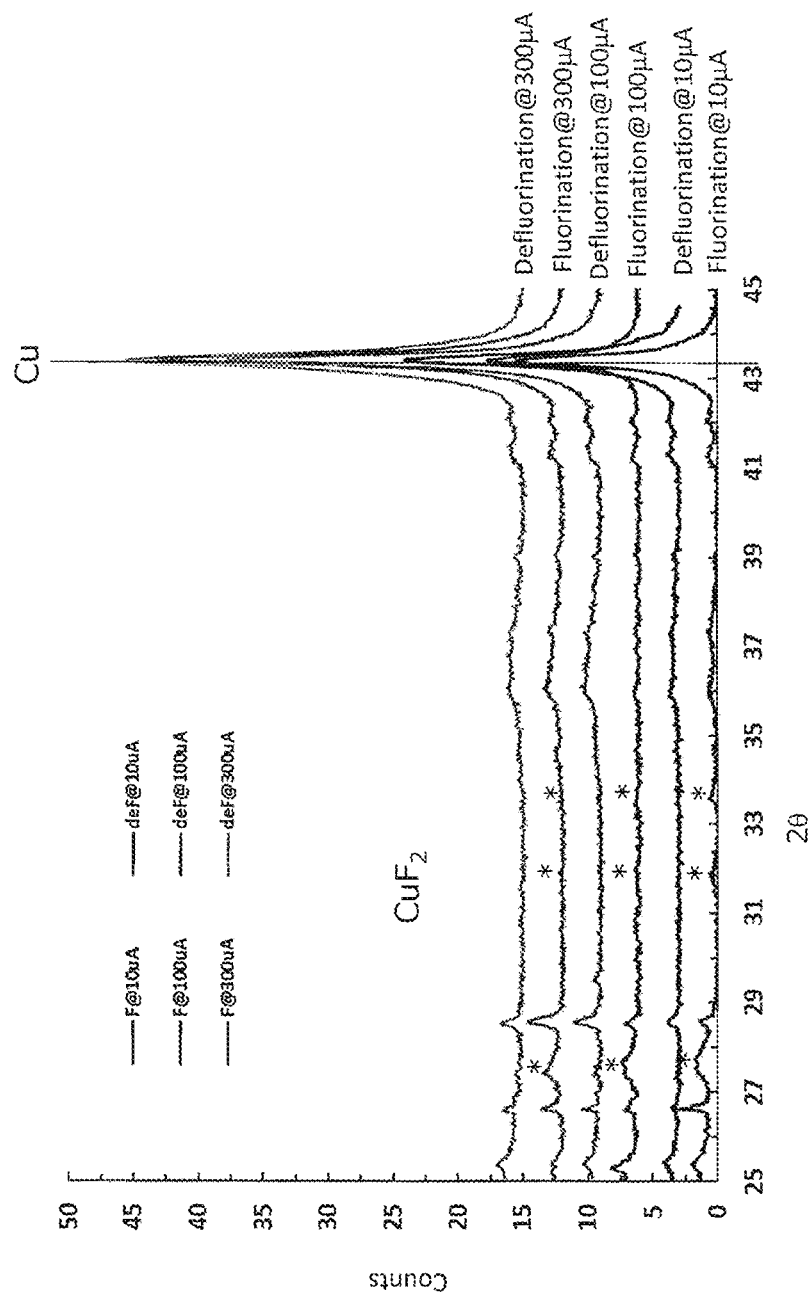
FIG. 9 shows an X-ray powder diffraction (p-XRD) pattern according to Example IV.

FIG. 9 shows the p-XRD patterns corresponding to the electrochemically active structure after charge (i.e., fluorination) and discharge (i.e., defluorination). As shown in FIG. 9, copper turns into $CuF_2$ after charge, whereas $CuF_2$ is reduced to copper after discharge. It was thus concluded that copper may be reversibly charged with shell protection at all of the currents studied.

Example V: All-Atom Molecular Dynamics Simulations of Self-Assembled Monolayer Interfaces for Metal Electrode Passivation All-atom molecular dynamics simulations are performed to explore design rules for passivating self-assembled monolayers (SAMs) of metal electrodes in fluoride-ion batteries. Four different SAM molecules are investigated with regard to the presence of α-CH2 and/or fluorinated carbon ($CF_2$) moiety including E-$(CH_2)_2(CH_2OCH_2CF_2)_2F$, E-$(CH_2)_2(CF_2CH_2)_3CF_3$, E-$(CH_2)_2(CH_2OCH_2)_3H$, E-$(CH_2)_2(CF_2)_7CF_3$. Here, E stands for an electrode. Both considerations were identified to have to do with fluoride-ion solvation. Fluoride salt, $Np_2F$ (N,N,N-dimethyl-N,N-dineopentylammonium fluoride) was introduced in the simulation cell at a molar density ca. 1.2 M with either BTFE (bis(2,2,2-trifluoroethyl) ether) or glyme electrolyte. Based on the simulation results (which consider both the fluoride-ion SAM intercalation statistics and kinetics, discussed below), a combination of $(CH_2OCH_2CF_2)_2F$ and glyme is considered the best among a set of investigated combinations between SAM moiety and solvent.

Model metal electrodes are held at a constant potential (V), each of which is either held at V=$V^-$ or $V^+$. Bias potential is ΔV=$V^+$−$V^-$. Charges of metallic atoms fluctuate in time. By doing so, charge-polarization of electrodes and the image-charge effect are included in the simulations.

SAM coverage density chosen here (5.625 $nm^{-2}$) is high enough to prevent electrolytes intercalation into a SAM region, satisfying the primary requirement of electrode passivation. At this SAM coverage density, the majority of SAM molecules stand up against the electrodes. Hereafter, the SAM region is between 5-14 Å from each of electrodes.

Figure 16:
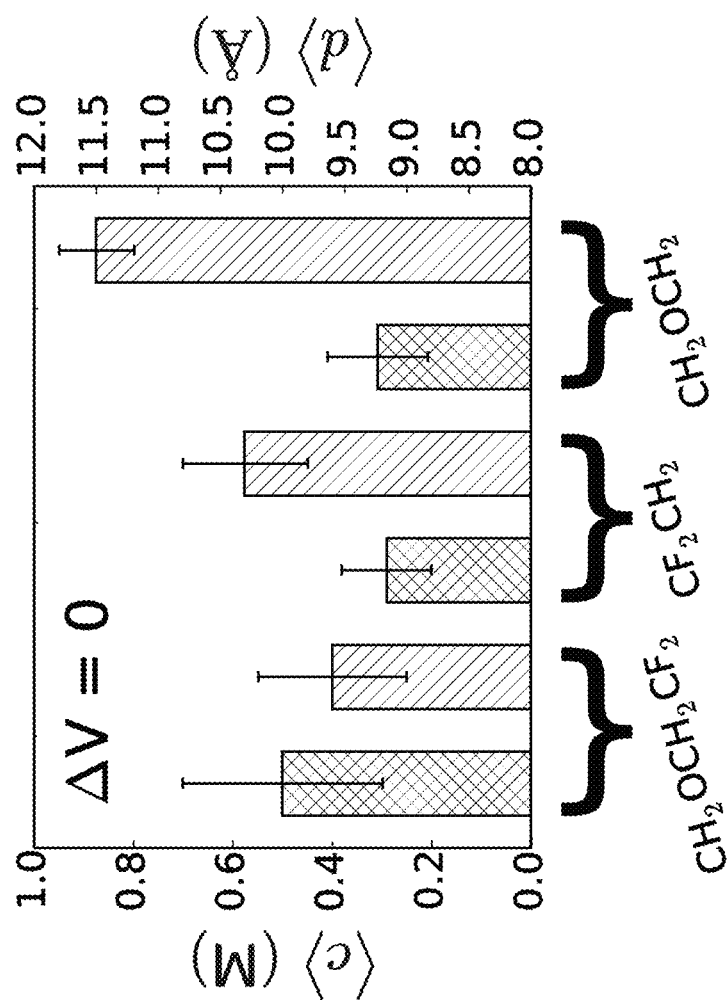
FIG. 16 shows average local density of fluoride-ion, $<c>$ in a SAM region and average distance of fluoride-ion from an electrode, $<d>$ at zero bias potential ($\Delta V=0$) according to Example V.

FIG. 16 presents the simulation results for fluoride-ion SAM intercalation statistics at ΔV=0 (zero bias potential) are presented. SAMs of $CH_2OCH_2CF_2$ and $CF_2CH_2$ moieties exhibit higher average local density, <c> of fluoride-ion in the SAM region (0.3-0.5 M) and shorter average distance, <d> of fluoride-ion from the electrode (9.5-11.5 Å) than SAM of $(CH_2OCH_2)_3H$ molecule. The SAM region considered is a region within 5-14 Å from each of electrode. This appears to the case whether the electrolyte is either BTFE or glyme. SAM of $(CF_2)_7CF_3$ molecule does not allow for fluoride-ion SAM intercalation. This observation suggests that both $CF_2$ and $CH_2$ moieties adjacent to each other are necessary for the SAM in order to not impede facile fluoride-ion SAM intercalation Hereafter, discussion is given only for SAMs of $CH_2OCH_2CF_2$ and $CF_2CH_2$ moieties, which allows for appreciable fluoride-ion SAM intercalation.

Figure 17A:
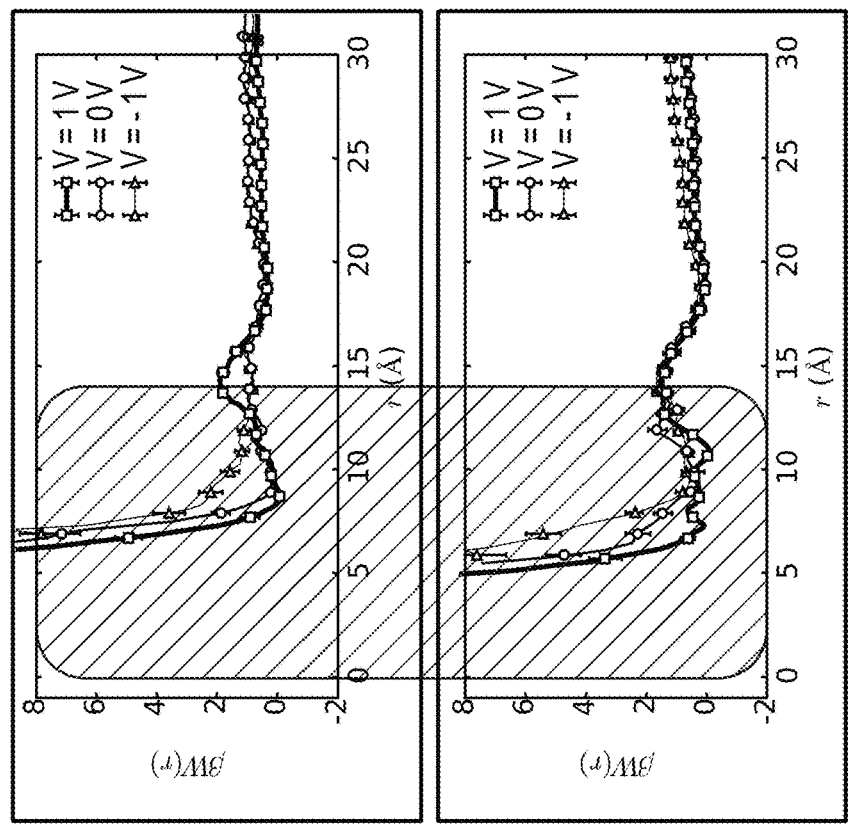
FIG. 17A shows the potential of mean force (PMF) for fluoride-ion SAM intercalation, at several electrode potentials according to Example V.
Figure 17A:
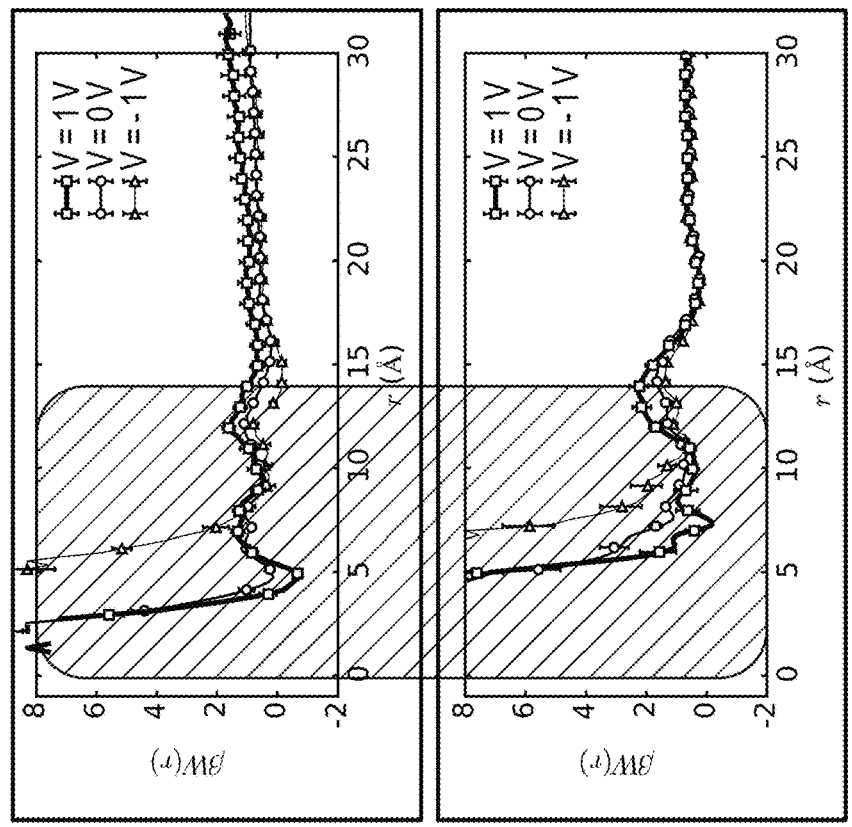
Figure 17B:
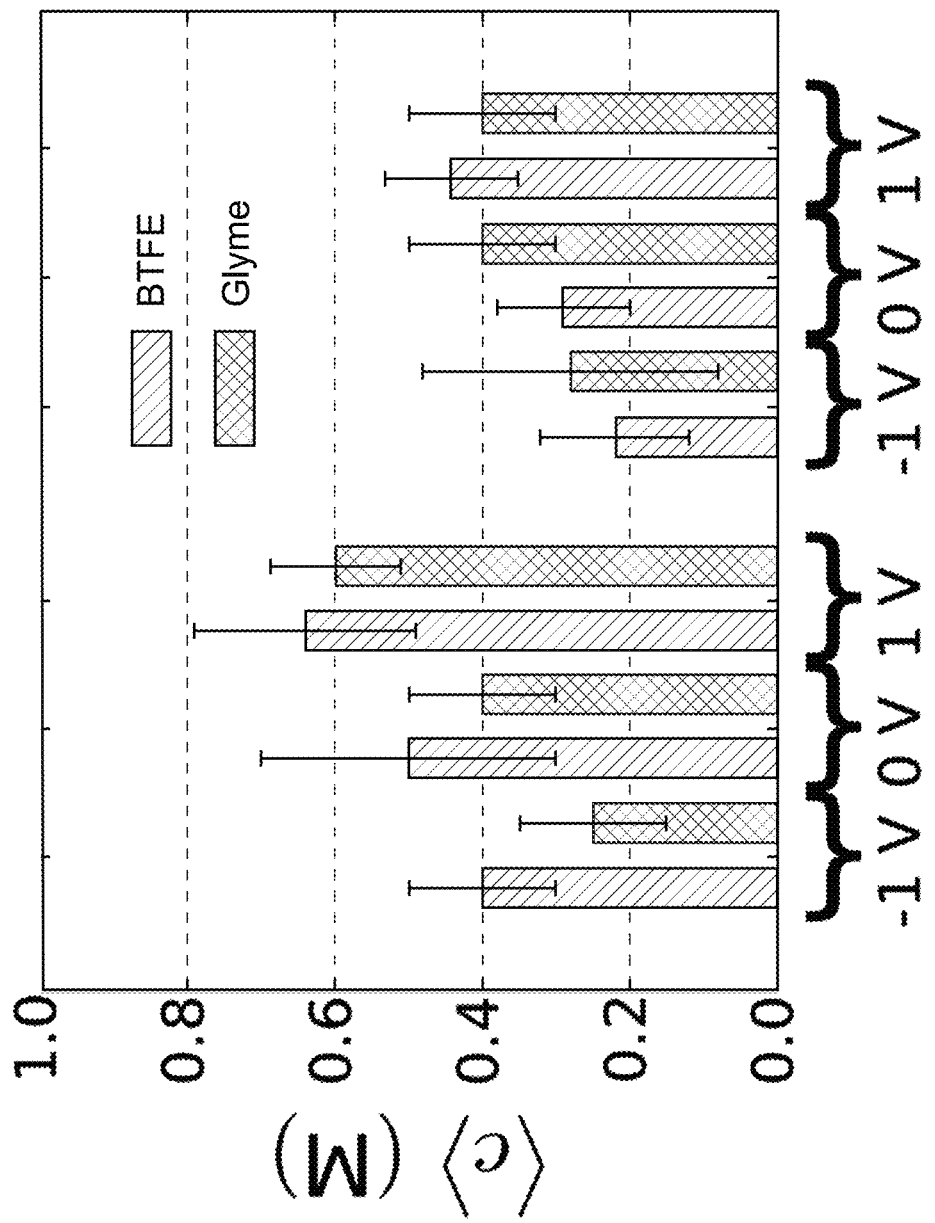
FIG. 17B shows average local density of fluoride-ion, $<c>$ in a SAM region at several electrode potentials according to Example V.
Figure 17C:
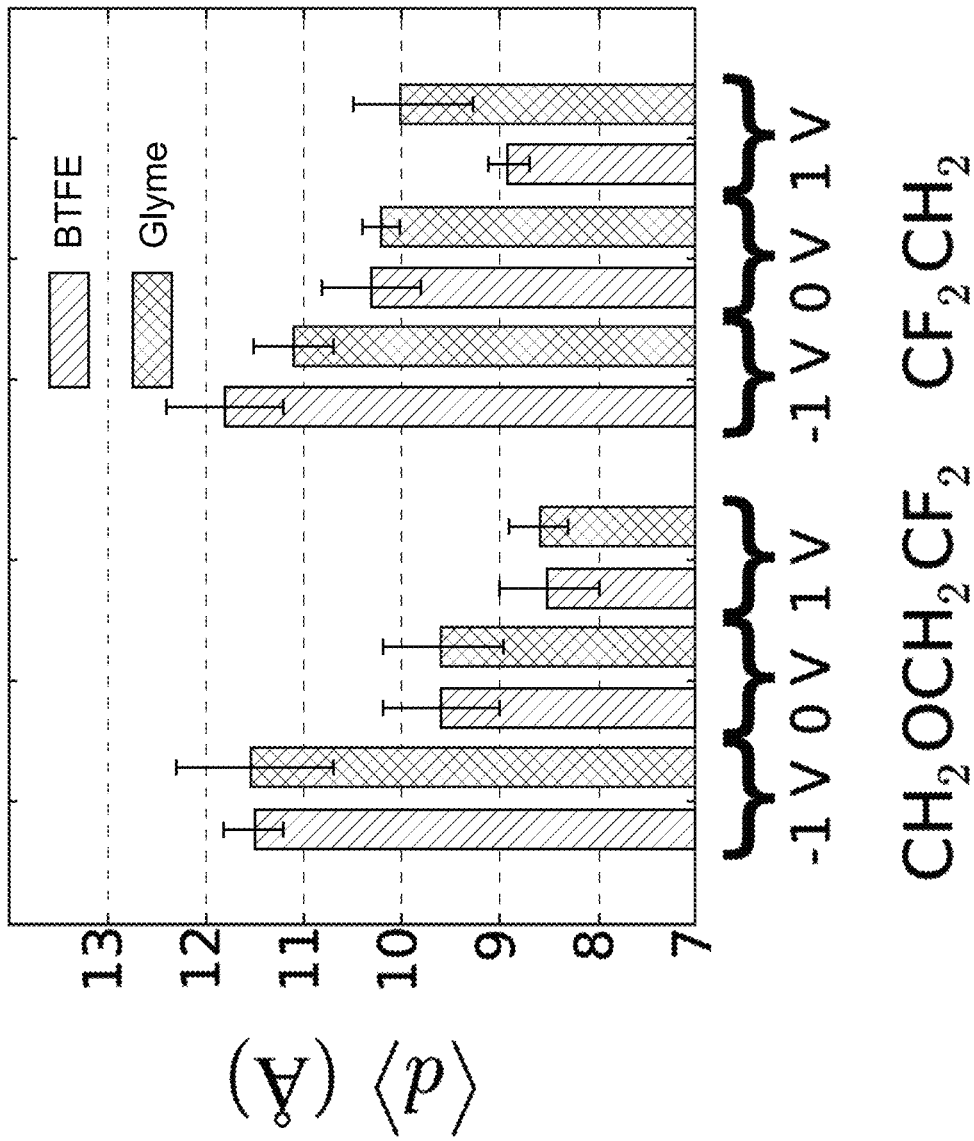
FIG. 17C shows average distance of fluoride-ion from an electrode, $<d>$ at several electrode potentials according to Example V.

With reference to FIG. 17A, calculated potentials of mean force (PMFs) at several electrode potentials (V=−1, 0, +1 V) are presented for the SAMs of $CH_2OCH_2CF_2$ and $CF_2CH_2$ moieties with either BTFE or glyme electrolyte. Electrode polarization changes the PMF, either enhancing or retarding fluoride-ion SAM intercalation. There is a barrier of approximately 2/β, where $β^{-1}=k_BT$, $k_B$ is Boltzmann's constant, and T=400 K, that separates the SAM and electrolyte regions, which is related to the fluoride-ion SAM intercalation kinetics. This observation suggests a potentially important role for intercalation kinetics in SAM design.

With reference to FIGS. 17 B-C, calculated average local density, <c> of fluoride-ion in the SAM region and shorter average distance, <d> of fluoride-ion from the electrode at several (V=−1, 0, +1 V) are presented for the SAMs of $CH_2OCH_2CF_2$ and $CF_2CH_2$ moieties with BTFE or glyme electrolyte. The SAM of $CH_2OCH_2CF_2$ moiety allows not only more fluoride-ions to intercalate but also to reside closer to the electrode than SAM of $(CF_2CH_2)_3CF_3$ molecule, i.e., higher <c> and smaller <d>. This appears to the case whether the electrolyte is either BTFE or glyme at all electrode potentials examined. Therefore, on the basis of fluoride-ion SAM intercalation statistics, the SAM of $CH_2OCH_2CF_2$ moiety is considered the best among those considered here.

Figure 18A:
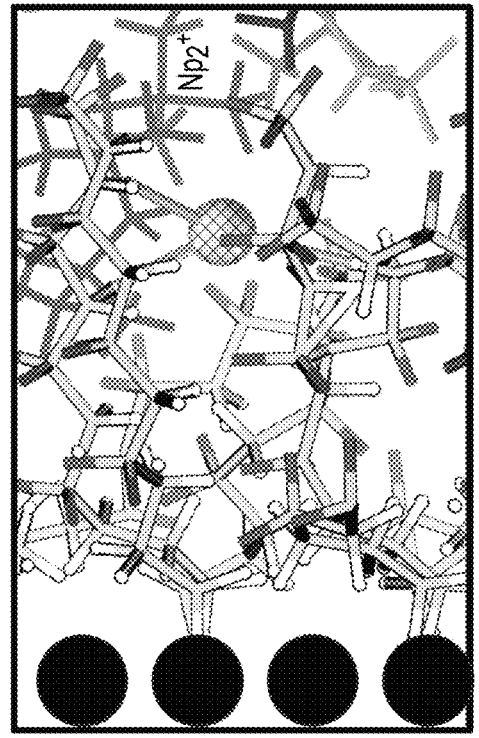
FIG. 18A shows all-atom configurations, illustrating fluoride-ion solvation inside a SAM region according to Example V.
Figure 18A:
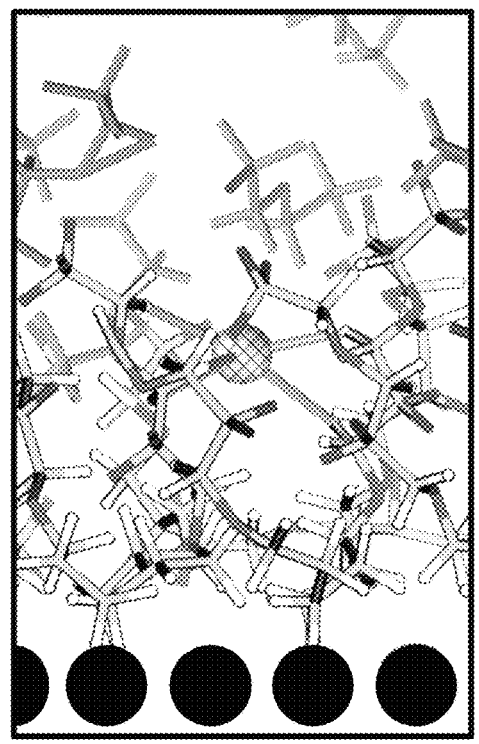

FIG. 18A illustrates fluoride ion solvation inside the SAMs. In particular, FIG. 18A indicates fluoride ions with a crisscross pattern and electrode atoms with solid black. The hydrogen atoms within 3 Å of the fluoride ions are considered "partners" that solvate the fluoride ion.

Figure 18B:
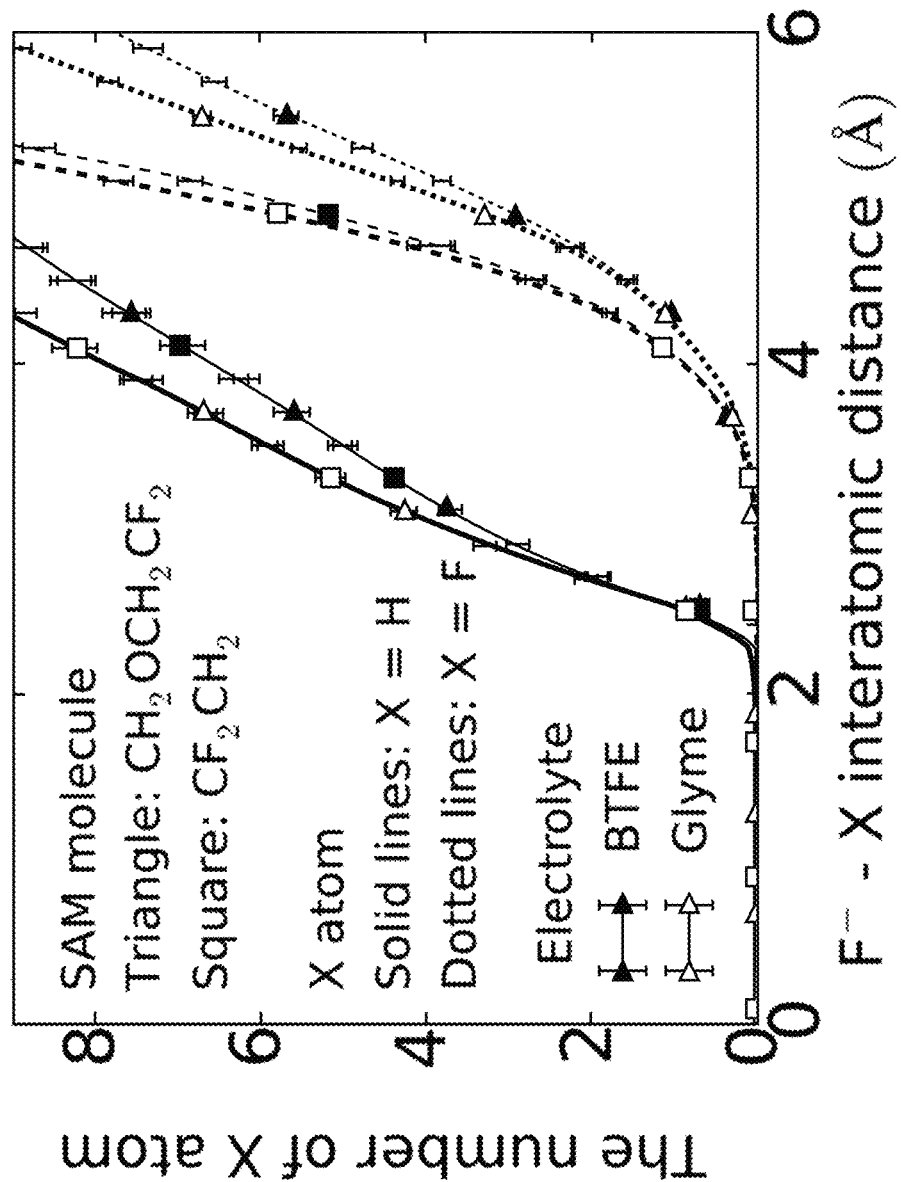
FIG. 18B shows the cumulative number of atoms (either F or H) around the fluoride-ion as a function of interatomic distance inside a SAM region according to Example V.

With reference to FIG. 18B, fluoride-ion solvation in the SAM and its kinetics at ΔV=0 is presented for the SAMs of $CH_2OCH_2CF_2$ and $CF_2CH_2$ moieties with either BTFE or glyme electrolyte. $CH_2$ moiety of the SAMs is confirmed to be responsible for fluoride-ion solvation, which is adjacent to $CF_2$ moiety.

Figure 18C:
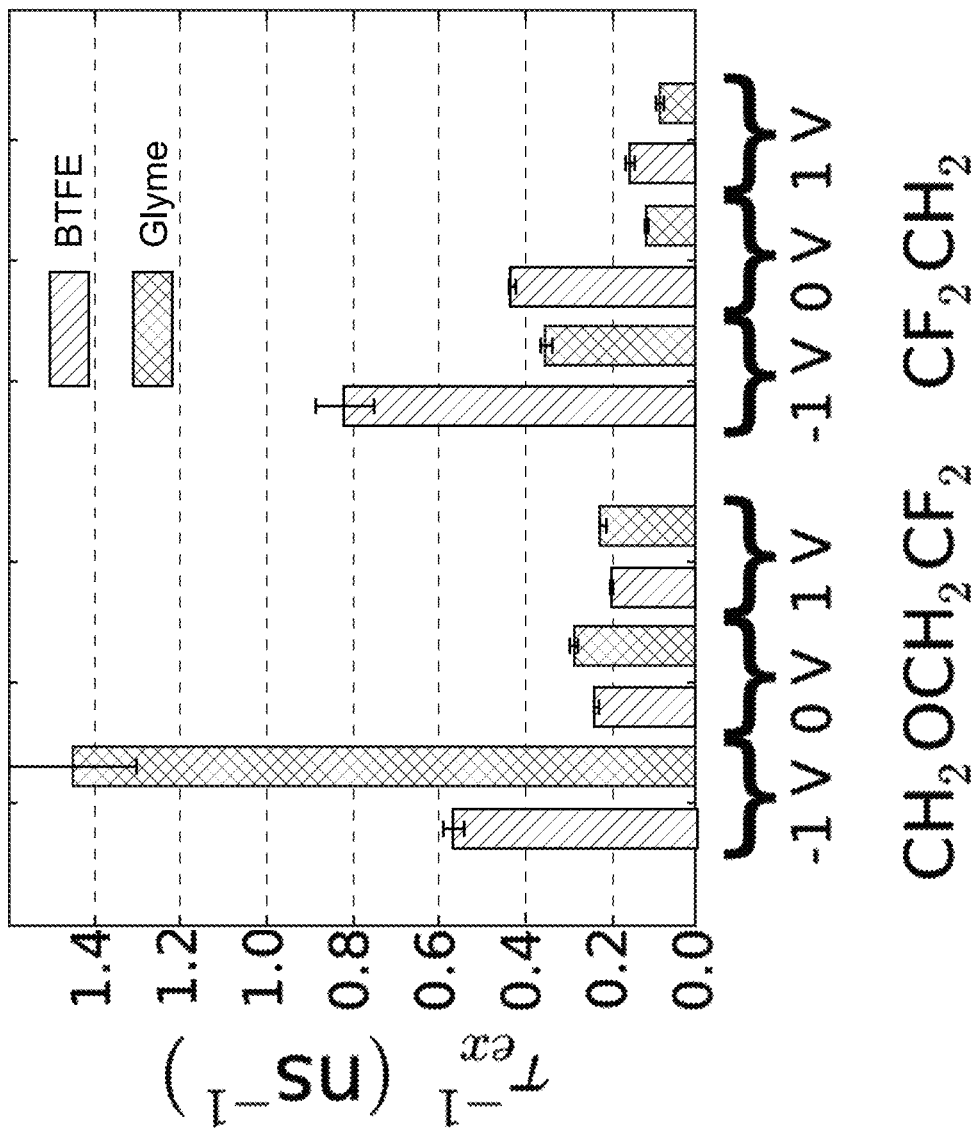
FIG. 18C shows the rate, $\tau^{-1}_{ex}$ of partner hydrogen exchange for fluoride-ion inside a SAM region according to Example V.

With reference to FIG. 18C, the calculated rate, $τ_{ex}^{-1}$ of "partner" hydrogen exchange is presented using a time-correlation function, H(t) for a bond between fluoride-ion and its partner hydrogen atom of a SAM molecule. Given that H(t) decays from 1 to $τ_{ex}$ is defined using H($τ_{ex}$)=$e^{-1}$. The "partner" exchange is a process that occurs at ~1 ns, which is associated with fluoride-ion hopping motion inside the SAM region.

Figure 19:
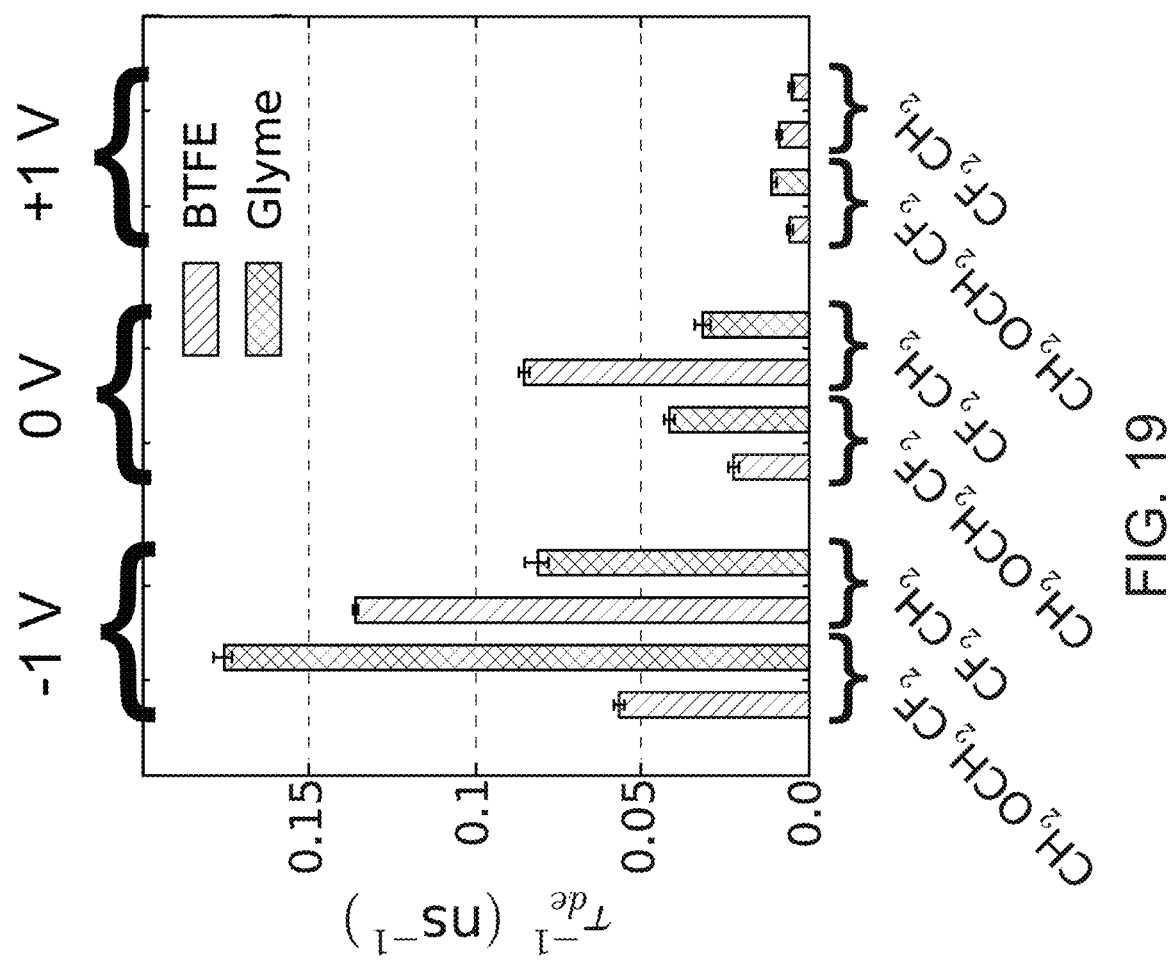
FIG. 19 shows the rate, $\tau^{-1}_{de}$ of fluoride-ion de-intercalation from a SAM region at several electrode potentials according to Example V.

With reference to FIG. 19, the calculated rate, $τ_{de}^{-1}$ of fluoride-ion de-intercalation using a time-correlation function, $F_{AB}(t)$ at several electrode potentials. $F_{AB}(t)$ decays from 1 to 0 when fluoride-ion de-intercalates from the SAM region to an electrolyte region. $τ_{de}$ is defined using $F_{AB}(τ_{de})$=$e^{-1}$. Compared to the partner exchange process, the de-intercalation is a much slow process (>20 ns), which is attributed to the sizable barrier for a fluoride-ion to overcome in the PMF shown in FIG. 17A.

Electrode polarization affects the de-intercalation kinetics, either enhancing or retarding the de-intercalation process. Further, the de-intercalation kinetics depends on electrolytes: the process is faster from the SAM of $CH_2OCH_2CF_2$ than from that of $CF_2CH_2$ moiety with glyme electrolyte, but is slower with BTFE electrolyte. This appears to the case at all electrode potentials examined. With a finite electrode potential, the SAM of $CH_2OCH_2CF_2$ with glyme electrolyte allows for the most facile fluoride-ion de-intercalation.

Simulation results for fluoride-ion SAM intercalation statistics and kinetics suggest the following design rules for a functional passivating SAM: (i) formation ability; dense enough SAM surface coverage to prevent electrolyte solvent intercalation, (ii) necessity of both α-$CH_2$ and $CF_2$ moieties for fluoride-ion solvation, or other moieties to favorably interaction with the fluoride-ion, to ensure substantial fluoride-ion SAM intercalation (iii) compatibility with electrolytes to ensure adequate kinetics of fluoride-ion SAM intercalation and deintercalation, and (iv) suitable end-group facing into the electrolyte to reduce a barrier for the fluoride-ion SAM intercalation to ensure adequate kinetics of fluoride-ion SAM intercalation and deintercalation.

Figure 20:
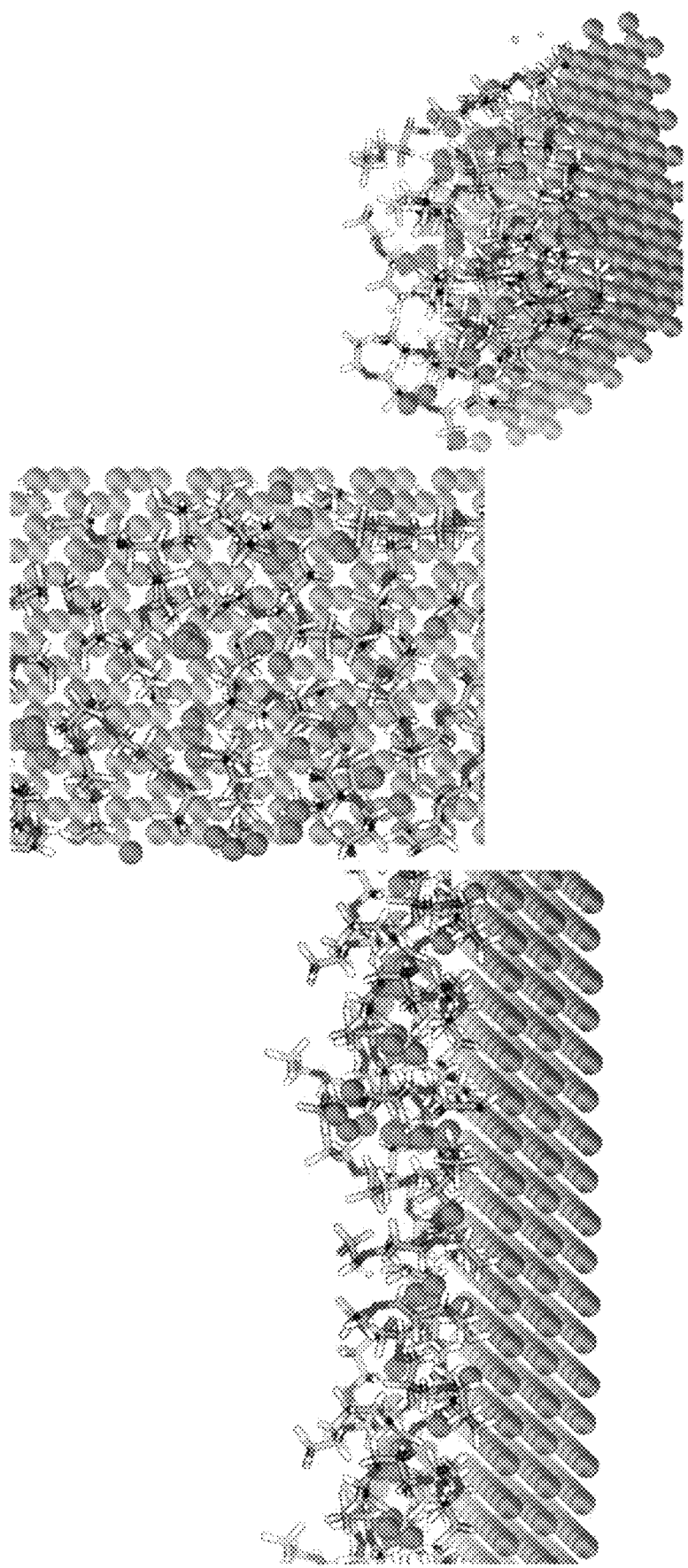
FIG. 20 shows the solvation site distribution on a metal-SAM interface according to Example V.

A pictorial depiction of fluoride ion solvation sites may be derived from these MD calculations (FIG. 20). In FIG. 20, dark grey indicates electrode atoms, grey indicates carbon atoms, red indicates oxygen atoms, white indicates hydrogen atoms, pink indicates fluorine atoms, and green indicates solvation sites This presents a snapshot of the spatial locations within the SAM that at which a fluoride-ion could be favorably solvated or bound. Following other work on lithium-ion solvation, including Webb et al., "Systematic computational and experimental investigation of lithium-ion transport mechanisms in polyester-based polymer electrolytes." ACS Cent. Sci., 1, 198 (2015); Webb et al., "Chemically specific dynamic bond percolation model for ion transport in polymer electrolytes." Macromolecules, 48, 7346 (2015); and Miller et al., "Designing polymer electrolytes for safe and high capacity rechargeable lithium batteries." Acc. Chem. Res., 50, 590 (2017), all of which are incorporated herein by reference in their entirety, the fluoride-ion solvation site distribution is determined at each configuration of the SAM using a distance-based criterion. The solvation sites are pruned to avoid redundancies and steric clashes with other atoms in the SAM.

The protocol used is as follows:
1. Sites are initially prepared on a rectangular grid (146520 sites).
2. Sites are collected if they have at least 4 nearby hydrogens of SAM molecules (within 3 Å).
3. Two sites are considered the same if they share at least the same closest 4 hydrogens. Position of a representative site for a set of the sites of having the same closest 4 hydrogens is the centroid of the sites.
3. The site has to have no significant overlap with all other atoms of SAM molecules and of an electrode (interatomic distance >2 Å).
4. The last step consolidates the sites if a) they share at least the same 2 hydrogen atoms, and b) their intersite distance is less than 1 Å. Position of the final consolidated site is the centroid of the sites that is being consolidated.

In the BTFE-like SAM shown in FIG. 20, 37 fluoride solvation sites (green) were identified.

The invention claimed is:

1. A liquid type F-shuttle battery comprising:
a cathode;
an anode; and
a fluoride ion conducting liquid electrolyte;
wherein the cathode comprises an electrochemically active structure comprising a core and a shell at least partially surrounding the core,
wherein the shell comprises a shell material consisting of a surfactant, and
wherein the surfactant comprises oleic acid and/or an oleylamine.

2. The liquid type F-shuttle battery of claim 1, wherein the shell consists of the shell material.

3. The battery according to claim 1,
wherein the core comprises an electrochemically active material selected from the group consisting of copper, iron, lead, bismuth, cobalt, tin, lanthanum, cerium, calcium, magnesium, lithium, alloys thereof, fluorides thereof, and combinations thereof, and
wherein the surfactant further comprises a surfactant having a functional group selected from the group consisting of —COOH, —COH, —OH, —SH, —PO₃H, —SO₃H, —CN, —NC, —R₂P, —COO⁻, —COO—OOCR, ene-diol, —C≡N, —N≡N⁺(BF₄⁻), —Sac, —SR, —SSR, —CSSH, —S₂O₃⁻Na⁺, —SeH, —SeSeR, —R₂P=O, —PO₃²⁻/—P(O)(OH)₂, —PO₄²⁻, —N≡C, —HC=CH₂, —C≡CH, —SiH₃, —OCH₂CH₃, formula (I), formula (II), formula (III), an alkyne, an aromatic ring, and combinations thereof, wherein formula (I) is:

formula (II) is:

and formula (III) is:

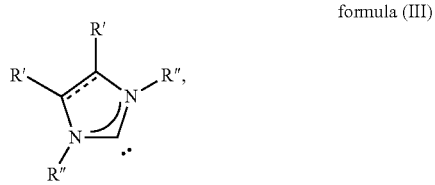

wherein R' and R" are each independently an organic chain or an aromatic group, either alone or in combination with another R' or R".

4. The battery according to claim 3, wherein the surfactant further comprises tris(trimethylsilyl)silane.

5. The battery according to claim 3, wherein the electrochemically active material is copper, copper (II) fluoride, or a combination thereof.

6. The battery according to claim 3, wherein the core comprises a nanoparticle having a diameter of between about 20 and 80 nm.

7. The battery according to claim 3, wherein the core comprises a nanowire having at least one dimension of between about 20 and 80 nm.

8. The battery according to claim 3, wherein the shell material is configured such that the electrochemically active structure is capable of charging and/or discharging at a current of at least about 50 μA.

* * * * *